US010015366B2

(12) United States Patent
Vanderhoydonck

(10) Patent No.: US 10,015,366 B2
(45) Date of Patent: Jul. 3, 2018

(54) VARIABLE RESOLUTION LOOKUP TABLE FOR ACCELERATED COLOR CONVERSION

(71) Applicant: Esko Software BVBA, Ghent (BE)

(72) Inventor: Kristof Vanderhoydonck, Ghent (BE)

(73) Assignee: ESKO SOFTWARE BVBA, Ghent (BE)

(*) Notice: Subject to any disclaimer, the term of this patent is extended or adjusted under 35 U.S.C. 154(b) by 0 days.

(21) Appl. No.: 15/260,728

(22) Filed: Sep. 9, 2016

(65) Prior Publication Data
US 2017/0257530 A1    Sep. 7, 2017

Related U.S. Application Data

(60) Provisional application No. 62/303,642, filed on Mar. 4, 2016.

(51) Int. Cl.
H04N 1/60 (2006.01)
H04N 1/46 (2006.01)
(Continued)

(52) U.S. Cl.
CPC ......... *H04N 1/6019* (2013.01); *G06K 15/102* (2013.01); *H04N 1/6008* (2013.01); *H04N 1/6058* (2013.01)

(58) Field of Classification Search
None
See application file for complete search history.

(56) References Cited

U.S. PATENT DOCUMENTS 5,530,656 A * 6/1996 Six .................. B41F 33/0045
                                                    101/211
5,633,662 A * 5/1997 Allen .................. B41J 2/2121
                                                    347/15
(Continued)

FOREIGN PATENT DOCUMENTS

EP       1014685 A2    6/2000
EP    2 884 731 A1     6/2015
WO       0396320 A1   11/2003

OTHER PUBLICATIONS

International Search Report and Written Opinion for International Application No. PCT/EP2017/055043, dated May 18, 2017, 13 pages.
(Continued)

Primary Examiner — Madelein T Nguyen
(74) Attorney, Agent, or Firm — RatnerPrestia

(57) ABSTRACT

Provided is a printing system comprising a printing mechanism for applying ink to a substrate using a plurality of print colors. Also included is a computer readable media storing an image and instructions for generating entries in a variable resolution lookup table for use in performing accelerated color conversion of the image. Also included is a lookup table generator configured to divide the lookup table into a plurality of areas, and set a density of lookup table entries in each of the plurality of areas based on overprint combinations of the print colors. The density of entries is varied from one area to another. Also included is a color conversion controller configured to utilize a lookup function to retrieve one or more lookup table entries and to provide printing color space coordinates based upon the one or more lookup table entries to the printing mechanism.

23 Claims, 12 Drawing Sheets

(51) Int. Cl.
*H04N 9/64* (2006.01)
*G06K 15/00* (2006.01)
*G06K 15/10* (2006.01)

(56) References Cited

U.S. PATENT DOCUMENTS

| | | | |
|---|---|---|---|
| 5,787,193 A | 7/1998 | Balasubramanian | |
| 5,933,578 A * | 8/1999 | Van de Capelle | G01J 3/46 101/23 |
| 6,023,351 A | 2/2000 | Newman | |
| 6,360,007 B1 * | 3/2002 | Robinson | H04N 1/6022 382/162 |
| 6,416,151 B1 * | 7/2002 | Otsuka | B41J 2/2135 347/19 |
| 6,464,319 B1 * | 10/2002 | Teshigawara | B41J 2/2135 347/19 |
| 6,621,498 B1 | 9/2003 | Handley et al. | |
| 7,573,607 B2 | 8/2009 | Huan et al. | |
| 7,667,869 B2 | 2/2010 | Nagao et al. | |
| 7,684,084 B2 | 3/2010 | Fan et al. | |
| 8,120,617 B2 | 2/2012 | Tin et al. | |
| 2002/0030709 A1 * | 3/2002 | Iwasaki | B41J 2/04505 347/19 |
| 2002/0145643 A1 * | 10/2002 | Vilanova | G06K 15/102 347/43 |
| 2002/0163655 A1 * | 11/2002 | Zhou | B41J 2/2056 358/1.4 |
| 2003/0016263 A1 * | 1/2003 | Takahashi | B41J 2/125 347/19 |
| 2006/0158478 A1 * | 7/2006 | Howarth | H05K 1/16 347/19 |
| 2006/0164430 A1 | 7/2006 | Tin et al. | |
| 2006/0227160 A1 * | 10/2006 | Takahashi | G06K 15/102 347/15 |
| 2006/0268297 A1 | 11/2006 | Han | |
| 2007/0188777 A1 * | 8/2007 | Kakutani | H04N 1/4051 358/1.9 |
| 2008/0111998 A1 * | 5/2008 | Edge | H04N 1/52 358/1.9 |
| 2008/0266608 A1 * | 10/2008 | Yamazaki | B41J 2/15 358/3.06 |
| 2010/0156987 A1 * | 6/2010 | Yip | B41J 29/393 347/19 |
| 2011/0216120 A1 * | 9/2011 | Friedman | B41F 33/0045 347/19 |
| 2012/0050762 A1 * | 3/2012 | Konno | H04N 1/54 358/1.9 |
| 2012/0194872 A1 * | 8/2012 | Komatsu | B41J 2/2114 358/3.23 |
| 2013/0065027 A1 * | 3/2013 | Mochizuki | C09D 11/101 428/195.1 |
| 2013/0258012 A1 * | 10/2013 | Boris | C09D 11/322 347/100 |
| 2015/0002907 A1 * | 1/2015 | Ukishima | G06K 15/1868 358/3.24 |
| 2015/0156369 A1 * | 6/2015 | Reed | H04N 1/32309 382/100 |
| 2016/0002482 A1 * | 1/2016 | Merchak | C09D 11/037 428/207 |
| 2016/0203790 A1 * | 7/2016 | Taylor | G09G 5/06 345/601 |
| 2016/0224875 A1 * | 8/2016 | Yamaguchi | G06K 15/4005 |
| 2016/0337554 A1 * | 11/2016 | Noffke | H04N 1/6008 |
| 2017/0013174 A1 * | 1/2017 | Morovic | H04N 1/6055 |
| 2017/0126932 A1 * | 5/2017 | Choulet | H04N 1/6058 |

OTHER PUBLICATIONS

Li et al., "Asymmetric 3D Lookup Table based Color Gamut Scalability in SHVC," 2015 Data Compression Conference, pp. 3-12.

Vrhel, "Indexing of Multidimensional Lookup Tables in Embedded Systems," IEEE Transactions on Image Processing, vol. 13, No. 10, Oct. 2004, pp. 1319-1326.

Balaji et al., "Preprocessing Methods for Improved Lossless Compression of Color Look-up Tables," Journal of Imaging Science and Technology 52(4): 040901-1 to 040901-9.

* cited by examiner

VARIABLE RESOLUTION LOOKUP TABLE FOR ACCELERATED COLOR CONVERSION

CROSS REFERENCE TO RELATED APPLICATIONS

This application claims priority to U.S. Provisional Patent Application No. 62/303,642, filed Mar. 4, 2016, the contents of such application being incorporated by reference herein.

FIELD

This invention relates generally to a lookup table used for color conversion of images from one color space to another color space. The invention seeks to develop a lookup table that is accurate and efficient to use even for large color spaces.

BACKGROUND

Conventional color conversion of large images from a source color space to a destination color space is typically performed by caching a large amount of conversions in a lookup table. For a given color value it is then easy and fast to look up surrounding values and interpolate a conversion for unknown values. Because the number of dimensions of the lookup table is equivalent to the number of inks in the source color space, this approach works well for a small number of inks (e.g. 4 inks (CMYK)) because there are only a small number of combinations of possible overprints. However, this technique rapidly becomes untenable for systems that use a higher number of inks (e.g. expanded gamut printing or spot color proofing). Developing a lookup table for all possible overprints of say 12 inks, would require a lookup table of massive proportions that would not fit into memory of a PC or printer.

BRIEF DESCRIPTION OF THE DRAWINGS

The drawing figures depict one or more implementations in accord with the present teachings, by way of example only, not by way of limitation. In the figures, like reference numerals refer to the same or similar elements.

SUMMARY

Figure 1:
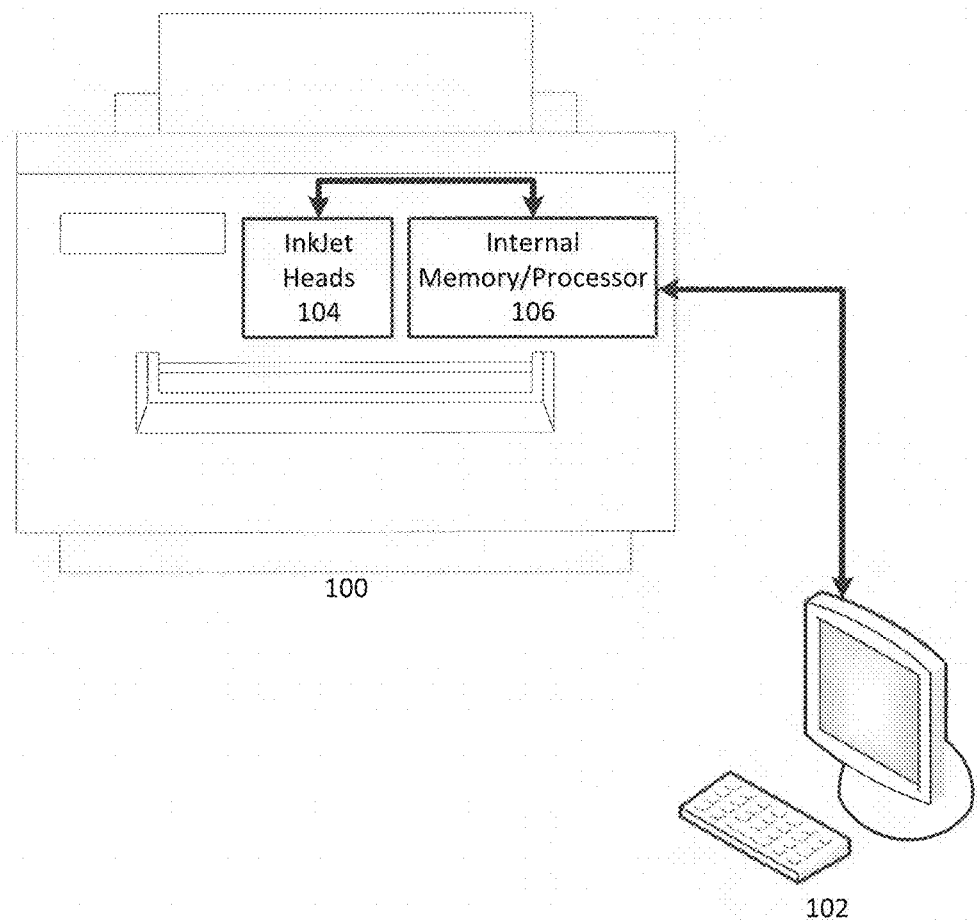
FIG. 1 shows a printer system for implementing a lookup table for accelerated color conversion between color spaces.

Provided is a printing system comprising a printing mechanism for applying ink to a substrate. The printing mechanism operable to print using a plurality of print colors such that each unit of a printed output has a color expressed as a set of coordinates in a printing color space, including some coordinates corresponding to ink overprint combinations. Also included is a computer readable media storing digital information including instructions for reading an input image file comprising information defining an image in which each unit of the image has a color defined by a combination of image colors expressed as a set of coordinates in an image color space, and instructions for generating entries in a variable resolution lookup table for use in performing accelerated color conversion of the image from the image color space to the printing color space using a color conversion function. Also included is a lookup table generator configured to divide the lookup table into a plurality of areas, each area corresponding to a printing color subspace, set a density of lookup table entries in each of the plurality of areas based on overprint combinations of the print colors, wherein the density of entries is varied from one area to another, store the lookup table entries according to the varied density, such that the lookup table includes a varied grid of color values corresponding to the printing color space, and generate a lookup function for accessing the lookup table entries when performing accelerated color conversion from the image space to the substrate. Also included is a color conversion controller configured to utilize the lookup function to retrieve one or more lookup table entries and to provide printing color space coordinates based upon the one or more lookup table entries to the printing mechanism for applying the ink to a substrate.

Provided is a printing system comprising a printing mechanism for applying ink to a substrate, the printing mechanism operable to print using a plurality of print colors such that each unit of a printed output has a color expressed as a set of coordinates in a printing color space. Also included is a computer readable media storing digital information including instructions for reading an input image file comprising information defining an image in which each unit of the image has a color defined by a combination of image colors expressed as a set of coordinates in an image color space. Also included is a lookup table including a plurality of areas having a varied density of lookup table entries for use in performing accelerated color conversion of the image from the image color space to the printing color space using a color conversion function, wherein the density in each of the plurality of areas is based on likelihood of the printing mechanism using the overprints corresponding to the printing space coordinates represented by the lookup table entries, and instructions for implementing a lookup function for the printing mechanism to access the lookup table entries when performing accelerated color conversion of the image. Also included is a color conversion controller configured to access the stored digital information corresponding to the image, determine image color space coordinates of selected pixels in the image, retrieve entries from the lookup table when the lookup table includes entries that correspond to the printing space coordinates corresponding to the image color space coordinates of the selected pixels, interpolate entries from the lookup table when the lookup table does not include entries that correspond to the image color space coordinates, and control the printing mechanism to apply the ink to the substrate based on the retrieved and interpolated entries.

Provided is an image output method comprising accessing, by a color conversion controller, digital information stored on a computer readable media to implement a lookup function. The stored digital information including a variable density lookup table comprising a plurality of lookup table entries for converting coordinates in an input color space to coordinates in an output color space using a color conversion function, the lookup table including a plurality of areas, the plurality of areas having a plurality of densities of lookup table entries, wherein the density in each of the plurality of areas is based upon likelihood of color combinations represented by the areas being utilized by an output device, and instructions for implementing the lookup function to access the lookup table entries when performing accelerated color conversion from the input color space to the output color space for providing coordinates in the output color space to the output device. Also included is a determining, by the color conversion controller, of input color space coordinates corresponding to selected pixels in an input image, retrieving, by the color conversion controller, of entries from the lookup table when the lookup table is populated with entries that correspond to the output color space coordinates of the selected pixels, the retrieved entries the output color space coordinates that correspond to input color space coordinates converted using the color conversion function, interpolating, by the color conversion controller, of output color space coordinates using neighboring entries from the lookup table when the lookup table is not populated with entries that correspond to the output color space coordinates of the selected colors, and controlling, by the color conversion controller, of the output device to apply the retrieved and interpolated entries to create a representation of the input image in the output color space using the output device.

Detailed Description

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

This invention is aimed at the multicolour market in the context of devices that have a large number of inks (e.g. most proofers, digital presses, conventional presses using an expanded gamut system). In the context of proofing, it occurs very frequently that the source color space is higher dimensional.

The invention includes a lookup table (e.g. a single lookup table) that is no longer a regular grid in the (source) color space. The lookup table includes a higher density of entries in color critical areas of the table and a lower density of entries in areas of the table that normally see less color conversions. By choosing an appropriate mathematical structure an efficient lookup table based on the number of inks is formed. For areas of the table with a lower density of entries, an efficient interpolation algorithm is utilized to estimate overprint values. This approach scales much better which makes it practical for most real world applications (e.g. systems with 15 inks).

In general, the invention is particularly suitable for color transitions between areas within an image having different resolutions, and for use in systems in which it is desirable to process one or more inks differently than others (e.g. by looking at whether they are a process or spot color). Flexibility in determining resolutions within the table makes the exemplary embodiments of the invention particularly applicable to the printing market.

In addition to these benefits, embodiments of the invention also exhibit good performance with respect to both processing time and memory utilization due in part to a data structure that comprises both externally and internally a single lookup table. This means embodiments of the invention may be particularly useful for implementation in any system configured for use of a lookup table. Storing the points in a single table results in simpler and more efficient operation than if the points were distributed among smaller uniform tables.

Introduction: Accelerated Color Transformations

In general, colors are represented by coordinates in various vector spaces. Grassman's law states that for human color perception 3 dimensional spaces are sufficient and the standard ways of describing color are 3-dimensional. For a device producing color, the natural way of describing the produced color is as a combination of source colors (Red-Green-Blue RGB as in monitors) or source inks (Cyan-Magenta-Yellow-Key CMYK for office printers).

For the printing industry there are often many source inks (large presses often have space for up to 8 inks to be printed). On top of that it is common for artwork to contain spot colors. These are colors whose value is specified by some industry standard (like Pantone) or that are typical for a brand (like Coca Cola red). The result is that many files in the printing industry that have artwork described in high-dimensional color spaces. A file containing 10 different inks is not uncommon, especially in the packaging industry where brand colors are important.

A central problem in color management is that there are two different devices. There is a device (e.g. computer 102 in FIG. 1) for viewing an image in source color space $C_{Input}$ and a device (e.g. printer 100 having memory 106 in FIG. 1) that prints in a destination color space $C_{output}$ (e.g. using inkjet heads 104). The image must therefore be converted from $C_{Input}$ to $C_{output}$ before printing.

All color spaces have a minimum and maximum value for each dimension (e.g. no ink or maximum amount of ink for a press). After normalizing, it can be said that every dimension has values from 0% to 100% (e.g. 5% Cyan ink and 20% Yellow ink will be the point (5,20) in the CY color space).

With sufficient information about $C_{Input}$ and $C_{output}$ it is possible to make a color transformation function (F: $C_{input}$->$C_{output}$) that will give a good match for the human eye (i.e. the human eye won't be able to tell a difference between the source and destination image). In the packaging industry, however, files contain complex artwork that is printed at a very high resolution. This means that millions upon millions of pixels need to be converted for every file. In practice the conversion of a typical file should take under a minute. Implementing conventional transformation functions F as computer algorithms, however, results in a slow conversion process.

Luckily the following property of color transformations holds true: For the color spaces of output devices, small changes in coordinates make small changes (a couple percent) in the resulting color. Moreover, if for a pixel x transformation F(x) is not known, but points $\{x_1, x_2 \ldots\}$ that are close to x are known and their functions $\{F(x_1), F(x_2) \ldots\}$ are also known, F(x) can be estimated by interpolating between pixels $\{x_1, x_2 \ldots\}$.

This estimation is the basis of accelerated color conversion. The idea is to save $\{F(x)|x \text{ in } X\}$ for enough points X so that no matter what pixel p is contained in the file, there are always enough points in X that are close to p so an approximation of F(p) can be interpolated.

Because X is much smaller than the amount of pixels in a typical file and interpolation is quite fast, the conversion speed is increased significantly. Also, if it is known that the same color spaces $C_{Input}$ and $C_{output}$ will be repeatedly used, $\{F(x)|x \text{ in } X\}$ may be calculated in advance and saved on the hard drive of the computer. This removes the implementation of F completely from the conversion time.

The method described above to accelerate color conversions can be divided into various parts. A description of these parts are described below.

The following are identified: 1) A definition of the set X, depending on the color space $C_{Input}$. This determines how many points need to be calculated with F. 2) An ordering O on X. This allows the storage of the results of $\{F(x)|x \text{ in } X\}$. 3) A fast way of determining O(x) for all x in X. This allows a quick look up of F(x) values in the cache; 4) A function N that for a given pixel c in C gives a set N(c) of points in X close to c. This gives the set of points that can be used in the interpolation. 5) An interpolation function I that for a given pixel c in C approximates F(c) using the cached values for N(c). Together these five parts give a complete approach to approximate F for every pixel.

Figure 2:
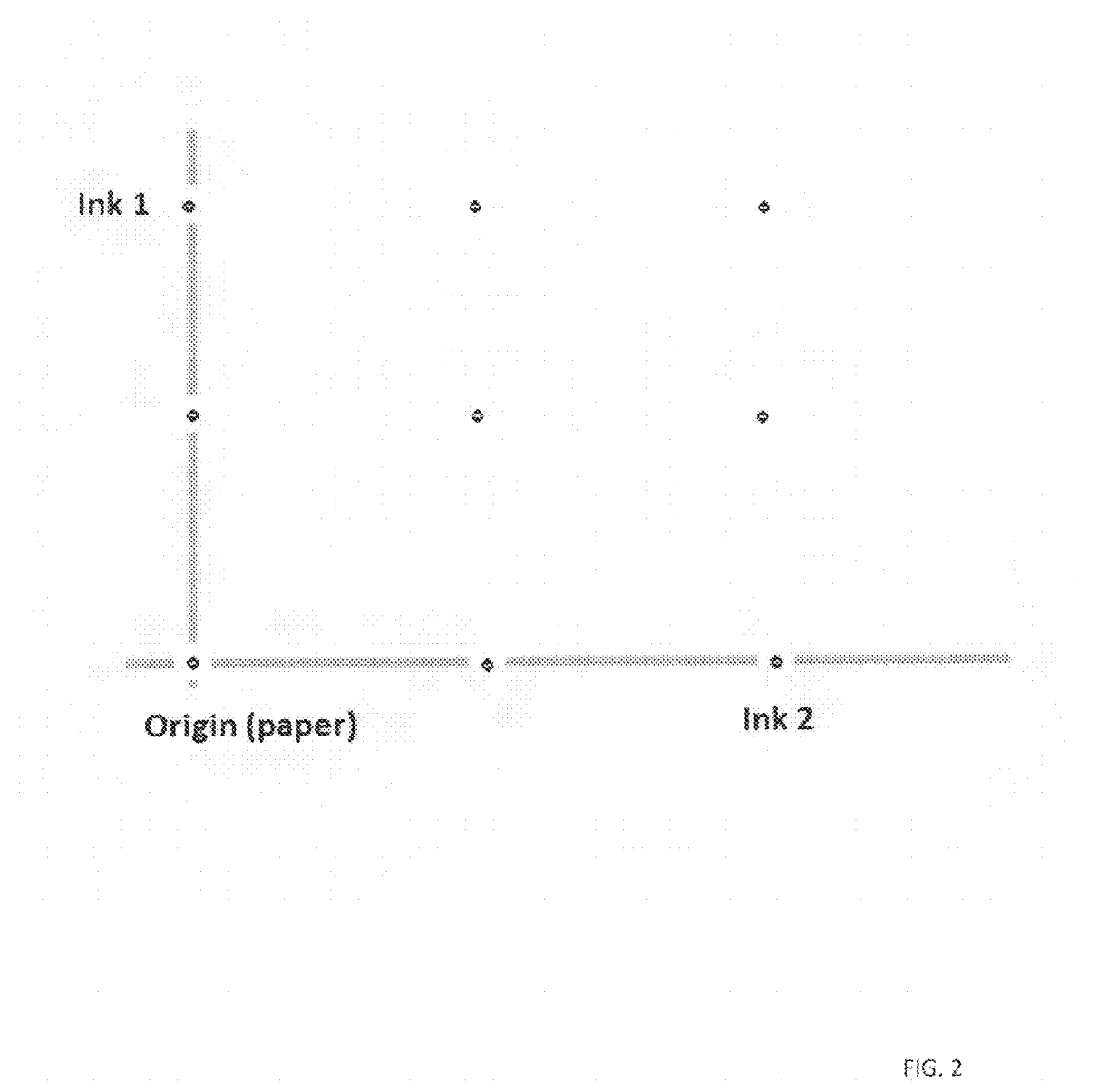
FIG. 2 shows a uniform resolution lookup table structure having uniformly distributed overprint values.
Figure 3:
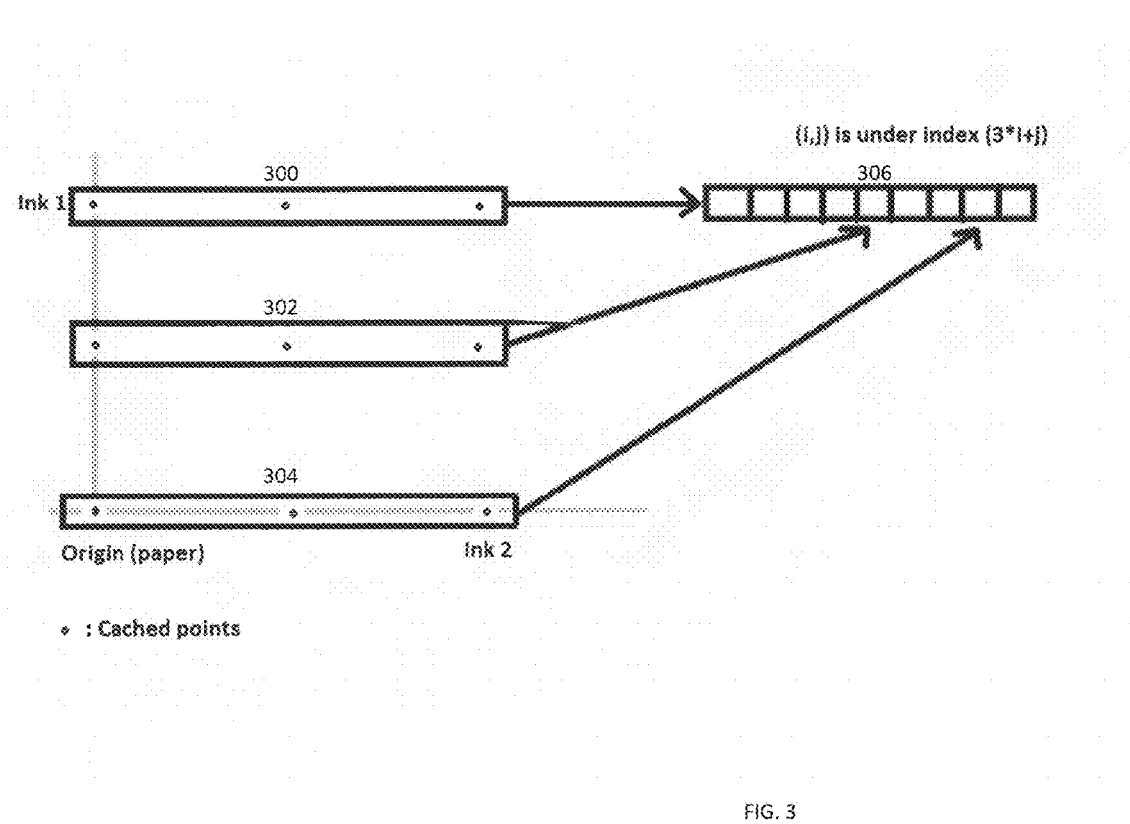
FIG. 3 shows how the uniform resolution lookup table overprint values are stored in memory.
Figure 4:
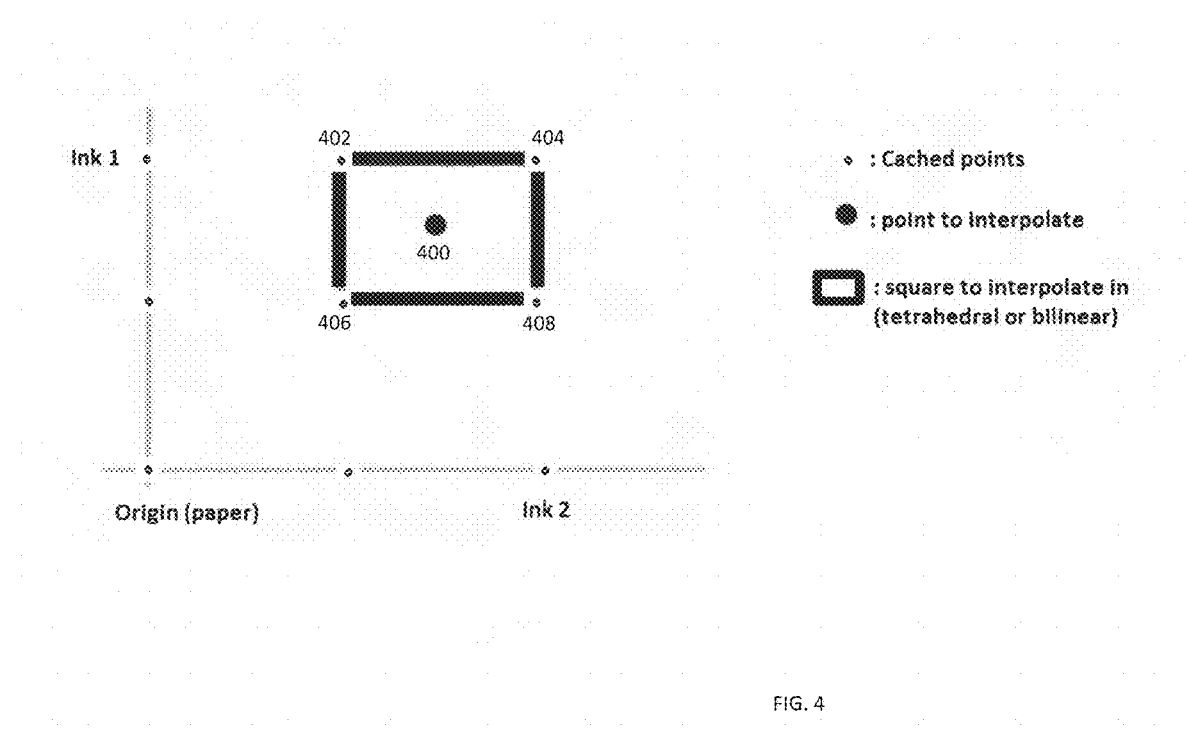
FIG. 4 shows interpolation between four overprint values in the uniform resolution lookup table.

In order to clearly describe the lookup process, FIGS. 2-4 show an example of a simple lookup table and process for two inks with a finite number of points. It should be noted that although FIGS. 2-4 only shows two inks being utilized and only nine values, that N ink values (where N is an integer number greater than 1) may be utilized storing thousands if not millions of values in the lookup table.

FIG. 2 shows the structure for a uniform resolution look-up table. For simplicity, the look-up table is shown with overprints for only two inks (ink 1 and ink 2). As shown in FIG. 2, the overprint values for different combinations of inks, ink 1 and ink 2, are distributed uniformly throughout the table. Therefore, for any given value of ink 1 and ink 2, there is a resulting overprint value stored in the look-up table.

FIG. 3 shows the same uniform resolution look-up table structure from FIG. 2. During operation, each of the overprint values of the table must be cached in memory in a particular order for easy retrieval during conversion. An example of this caching process is shown in FIG. 3 where the overprint values are broken up into rows 300, 302 and 304. These overprint values are then stored in a particular order in cache memory 306 (of the PC or the Printer device).

When utilizing an overprint value look-up table, certain values for combinations of inks will not be stored (i.e., the look-up table will only have a finite number of cached values). Thus, when performing accelerated color conversion utilizing look-up tables, interpolation is typically performed to determine values that are not stored in the look-up table.

An illustration of interpolation is shown in FIG. 4 where points 402, 404, 406 and 408 are stored in the look-up table. However, point 400 is not stored in the look-up table, and therefore must be interpolated. In order to perform interpolation to determine the overprint value 400, the system (e.g. PC or Printer) typically utilizes the values of neighboring overprint values (e.g., values 402, 404, 406 and 408) in order to estimate value 400.

The estimation of point 400 may be performed based on the values of the neighboring pixels as well as their relative distance point 400. For example, if all four points 402, 404, 406 and 408 are equidistance to interpolation point 400, then all of their values may all be weighted equally. However, if, for example, points 402 and 404 were closer to point 400 then were points 406 and 408, then the value of interpolation point 400 would be more dependent on the overprint values of closer values 402 and 404, respectively. It should be noted that although in the interpolation shown in FIG. 4 shows interpolation being performed based on the four neighboring values, that more than four values can be utilized. The number of values and the position/weight of values selected for the interpolation is up to the designer of the system.

Uniform Resolution Table Implementation

Figure 5:
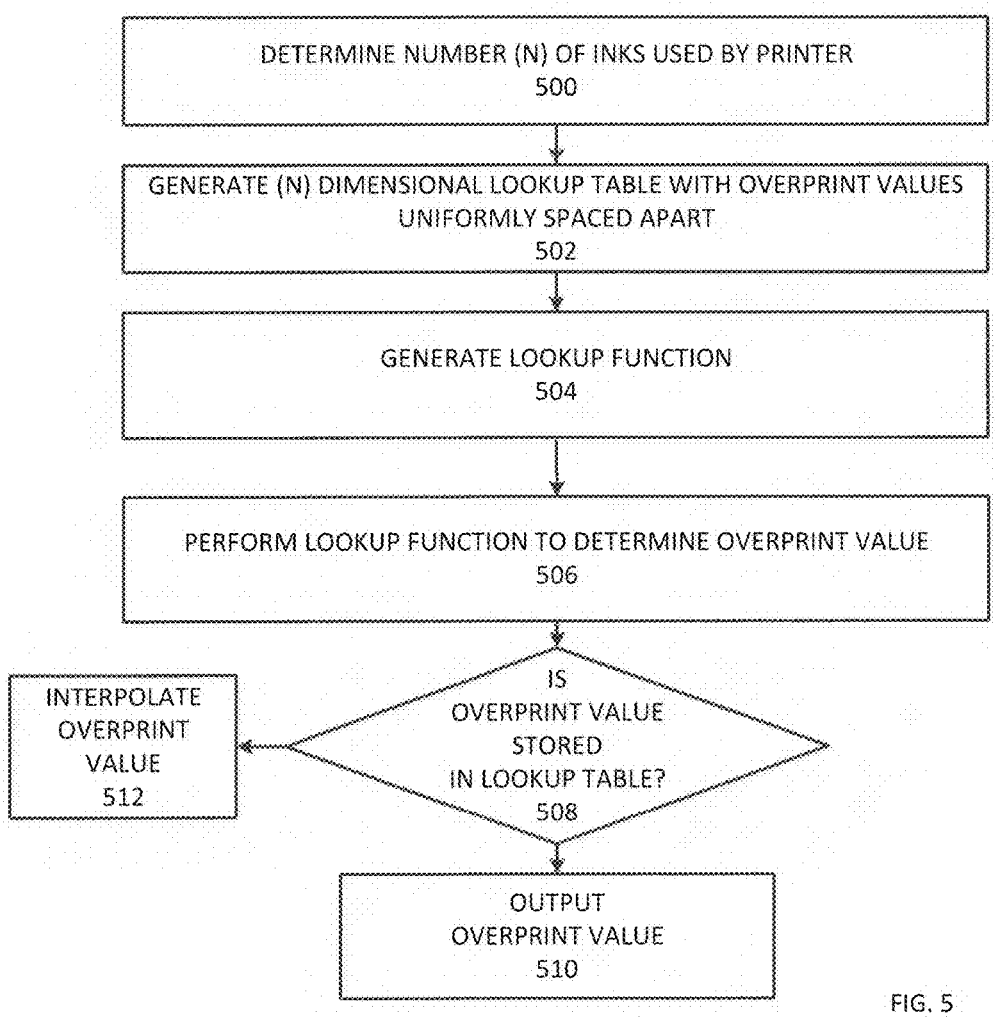
FIG. 5 shows a flowchart describing the uniform resolution lookup table implementation.

FIG. 5 shows a flowchart for a uniform resolution lookup table for performing color conversion. The example described below with respect to FIG. 5 is called a regular n-grid table. Pseudocode is given to further describe the operations.

In a first part of the process, the lookup table is generated based on the number of inks utilized and then stored in a specific order in memory. This is shown in FIG. 5 as steps 500 (DETERMINE NUMBER (N) OF INKS USED BY PRINTER) and 502 (GENERATE (N) DIMENSIONAL LOOKUP TABLE WITH OVERPRINT VALUES UNIFORMLY SPACED APART). Below is a detailed description of these steps.

As the name suggests, X is a regular n-grid in $C_{Input}$. For a fixed number n each axis is divided in n equidistant parts. This gives a resolution of n+1 in each direction. The space r between each part is 100/n. It is easy to find out what the points of X are since: A point $c=(c_1, c_2 \ldots)$ in $C_{Input}$ is a member of X if and only if all coordinates $c_i$ are a multiple of r (e.g. in 3 dimensions with n=100 X is the set of points with natural numbers as coordinates).

One type of ordering O on the values of X is lexicographic (i.e. if x and y are elements of X then x<y if and only if $x_i$<$y_i$ where i is the smallest number where $x_i$ and $y_i$ are different). For example, with X as in the previous example: (0,0,1)< (0,0,2) and (0,2,2)<(0,3,1) so the ordering of the set is (0,0,0)<(0,0,1)<(0,0,2), ... (100,100,99)<(100,100,100).

In a second part of the process, the lookup function is generated based on for accessing the values stored in lookup table. Generating and performing lookup is shown in FIG. 5 as steps 504 (GENERATE LOOKUP FUNCTION), 506 (PERFORM LOOKUP FUNCTION TO DETERMINE OVERPRINT VALUE), 508 (IS OVERPRINT VALUE STORED IN LOOKUP TABLE?) and 510 (OUTPUT OVERPRINT VALUE). Below is a detailed description of these steps.

Say F(x) is calculated for all x in X and stored in a list L that is ordered according to O. Say that $C_{Input}$ has dimension $d_{input}$. Then for a given x in X index Ind(x) of F(x) can be found in L as the following:

$$Ind(x) = \sum_{i=1}^{d_{input}} (x_i/r) \cdot n^{i-1}$$

Algorithmically this is a quickly calculated function that only depends on x and n (e.g. with X as in the previous example in which n=100: Point (15,0,8) will have a cached value on index $(15 \times 100^2) \times (0 \times 100) + 8 = 150008$ in the list of cached values).

In a third part of the process, the an interpolation algorithm is generated so that interpolation may take place in step 512 (INTERPOLATE OVERPRINT VALUE) of FIG. 5. Below is a detailed description of generating the interpolation function.

Before performing interpolation, a neighboring function must be generated. This is performed using hypercubes, which are essentially cubes generalized to higher dimensions. The hypercubes described herein consider cubes where each edge is parallel to one of the axes of the vector space. It should be also be noted that not all edges have to be the same length, but all edges that are in the same direction have the same length (Cfr. rectangle).

It is seen that the set X divides the color space $C_{Input}$ into a set H of hypercubes with corner points in X and edge length r. N is a function that for every point c in $C_{Input}$ returns the surrounding hypercube.

Origin o of the hypercube h in H is defined as the vertex of h that is the closest to the point (0,0, . . . , 0). It is seen that every hypercube in H has a unique origin point and every point in X is the origin point of at the most one hypercube in H. N is then reduced to a function O that for a given c in $C_{Input}$ returns the origin of the surrounding hypercube. O can then be defined as: Orig(c)=$(o_1, o_2 \ldots)$ where $o_i$==floor$(c_i/r).r$ (e.g. with X as in the previous example: pixel (15.3,0,8.34) is contained in the cube of length 1 and origin in (15,0,8)).

Once a hypercube is defined for a surrounding a point many different interpolation formula may be used. For example, an n-simplex interpolation may be used: For a given c in $C_{Input}$ and surrounding hypercube h in H, call $c^h$ a new set of normalized coordinates for c relative to h, specifically:

$$c_i^h = \left(c_i - \text{floor}\left(\frac{c_i}{r}\right) \cdot r\right) / r$$

Call G the function that maps a point $c^h$ in h back to its equivalent point c in $C_{Input}$. Let $O^{c,h}$ be an ordering on $c^h$ such that $O^{c,h}(i) < O^{c,h}(j) <=> c_i^h < c_j^h$ then n-simplex interpolation can be performed with the following pseudocode:

```
FUNCTION interpolateSimplex(c, hypercube h, cache F){
    result = (0,0,...,0)
    weightSum = 0
    remainingCoordinates = c^h
    currentVertex = (0,0,...,0)
    FOR(a in 1...d_input){
        weight = remainingCoordinates [O^{c,h}(a)]
        currentVertex[O^{c,h}(a)] = 1
        IF(weight>0){
            result += F(G(currentVertex)). weight
            remainingCoordinates -= (1,1,...,1) .weight
            weightSum+=weight
        } }
    result += F(G((0,0,...,0))). (1-weightSum)
    return result
}
```

It should be noted that in general, n-simplex interpolation doesn't need to start at (0, 0, . . . , 0) but for color conversion this may be beneficial since then the axis (0, 0, . . . , 0) to (1, 1, . . . , 1) which corresponds to the neutral grey colors, is calculated with the best accuracy.

During implementation of the algorithm in FIG. 5, an n between 10 and 20 would be used to perform color conversions. The value n is chosen depending on the accuracy required and the extent to which the involved color spaces match the linear behavior of the interpolation formula. Typically this approach works well if $C_{Input}$ is of a low dimension, like RGB or CMYK. It should be noted, however, even n=10 will generate $11^{d_{input}}$ points in the grid. For example, if a packaging file with 9 colors is used, about 2,400,000,000 points need to be generated in the table. However, it may be impractical to calculate F(x) for all of these points or even to reserve enough RAM memory to cache all of these values.

There are ways around this problem (e.g. by cutting up $C_{Input}$ in smaller color spaces through which are converted separately, after which results of all the conversions are combined). However, this combination is done in $C_{output}$ and cannot take into account the information about how these smaller color spaces interact. As a result color accuracy is lost for all combinations that fall in multiple subdivisions of $C_{Input}$ and the transitions from one subdivision to another sometimes suffer from sharp changes in behavior, resulting in unwanted artifacts in the final result.

Figure 6A:
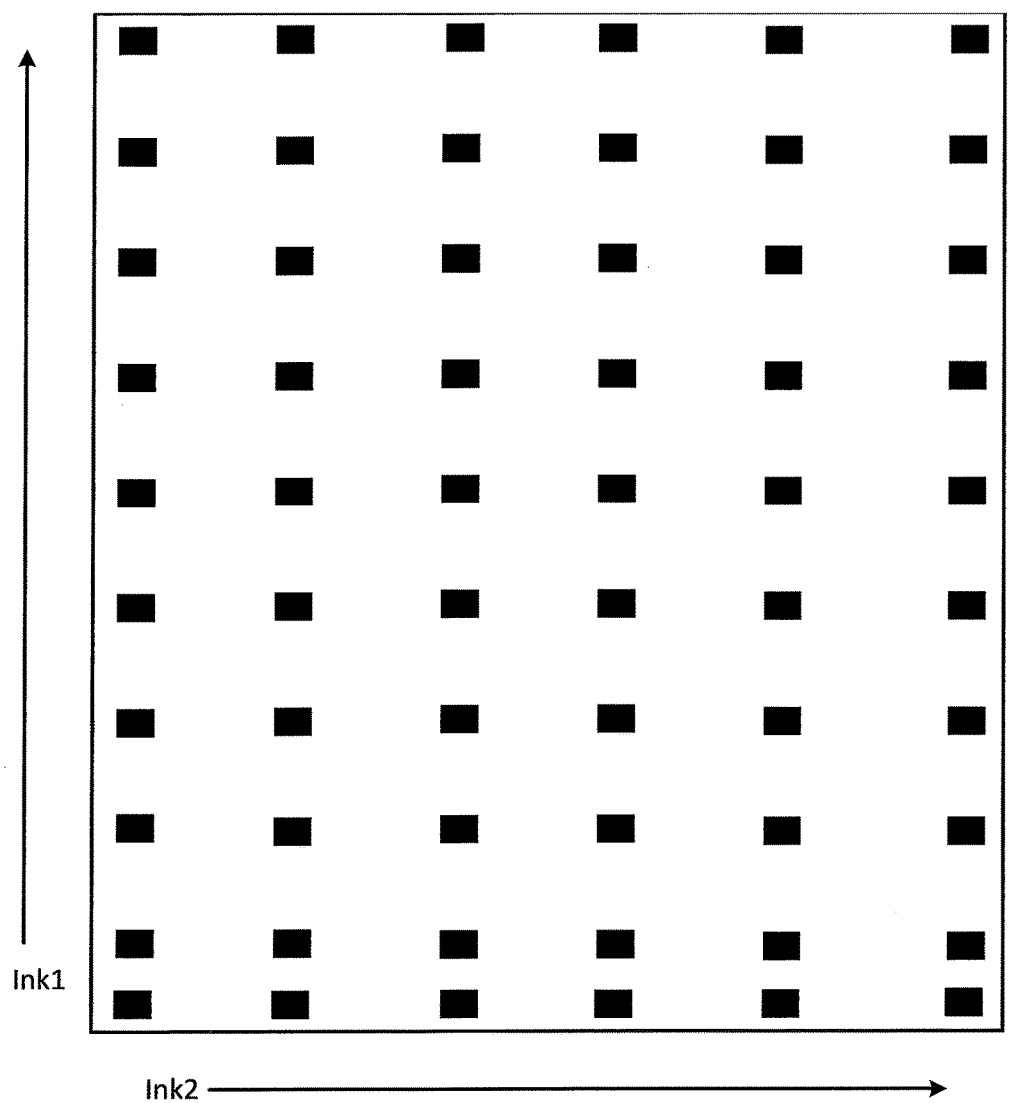
FIG. 6A shows the uniform resolution lookup table structure having uniformly distributed overprint values.

As described with respect to FIG. 2, uniform resolution look-up tables include uniform entries of ink overprint values. On a somewhat larger scale, this uniform table is shown in FIG. 6A for ink 1 and ink 2. It can be seen that the number of values in the look-up table increases dramatically as the size of a look-up table increases. This is further amplified by the use of more than two inks (not shown).

Figure 6B:
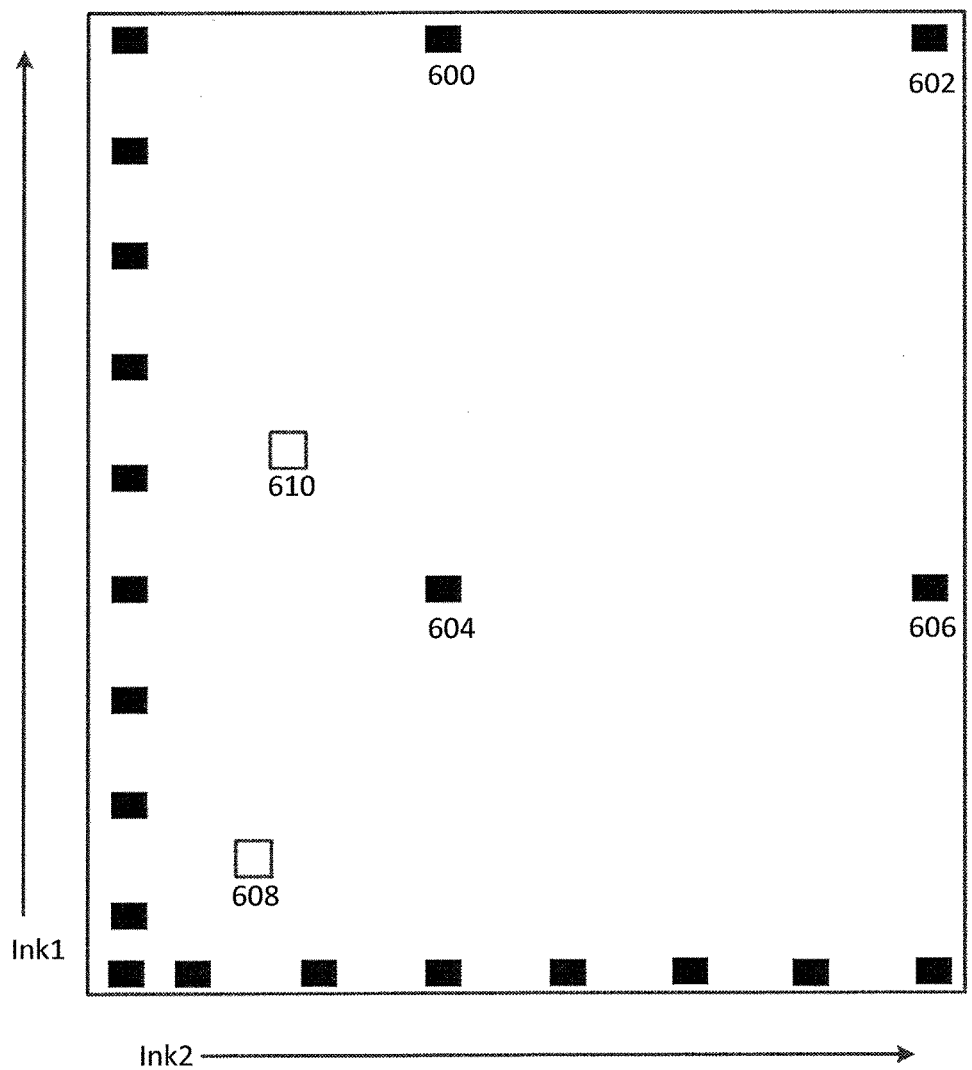
FIG. 6B shows a variable resolution lookup table having a variable distribution of overprint values.

Rather than creating a uniform resolution look-up table with uniform entries, the present system (as shown in FIG. 6B) generates a variable resolution look-up table. This variable resolution look-up table shown in FIG. 6B is a single lookup table that includes a high resolution of overprint values in certain areas of the table (e.g., single color areas, CMYK areas), and a lower resolution of overprint values in other areas of the table (e.g. areas where the combination of inks is unlikely).

For example, as shown in FIG. 6B, the single ink areas (along the X and Y axis) have a high resolution of overprint values. However, the remainder of the table only includes four other overprint values 600, 602, 604 and 606. Thus, during operation the printer will be able to easily determine the overprint values for the single ink values along the X and Y axis simply by retrieving the values from the look-up table. However, any other value in the table aside from values 600, 602, 604 and 606 must be interpolated. For example, points 608 and 610 shown in the table must be interpolated based on the relative values of the neighboring points (e.g. points along the X and Y axis as well as points 600, 602, 604 and 606).

Figure 7:
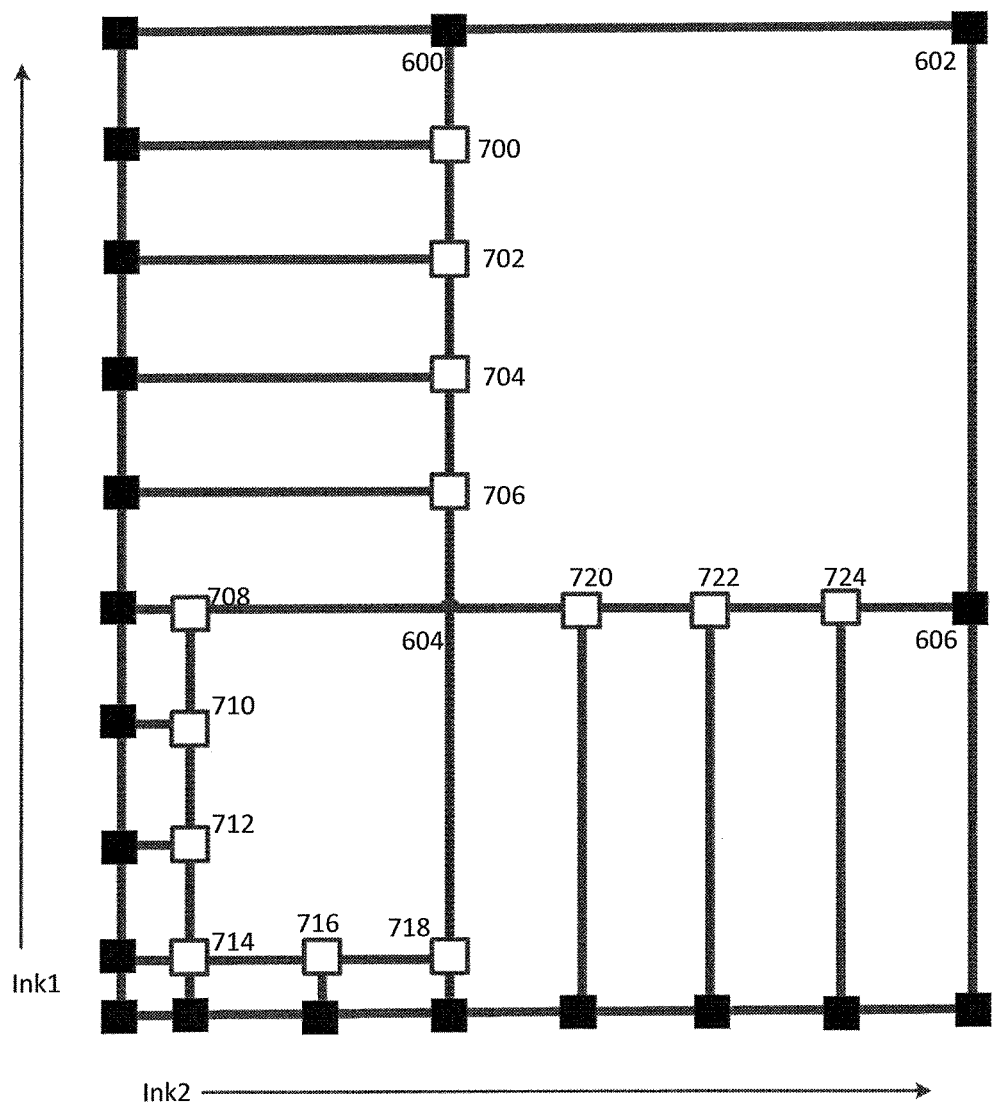
FIG. 7 shows interpolation between the variable distribution of overprint values in the variable resolution lookup table.

The interpolation of values in the table of FIG. 6B is shown in more detail in FIG. 7. For example, as shown in FIG. 7, the variable resolution table includes the high resolution overprint values along the X and Y axis as well as additional values 600, 602, 604 and 606. However, values 700, 702, 704, 706, 708, 710, 712, 714, 716, 718, 720, 722 and 724 are not stored in the table and therefore must be interpolated. The lines in FIG. 7 show the relative distance between interpolation points 700-724 and the other points (e.g. points along the X and Y axis as well as points 600, 602, 604 and 606) actually stored in the look-up table. During operation, if value 700 in the look-up table is requested, then the system determines (i.e., estimates) value 700 based on these neighboring values stored in the table.

Variable Resolution Table Implementation

Figure 8:
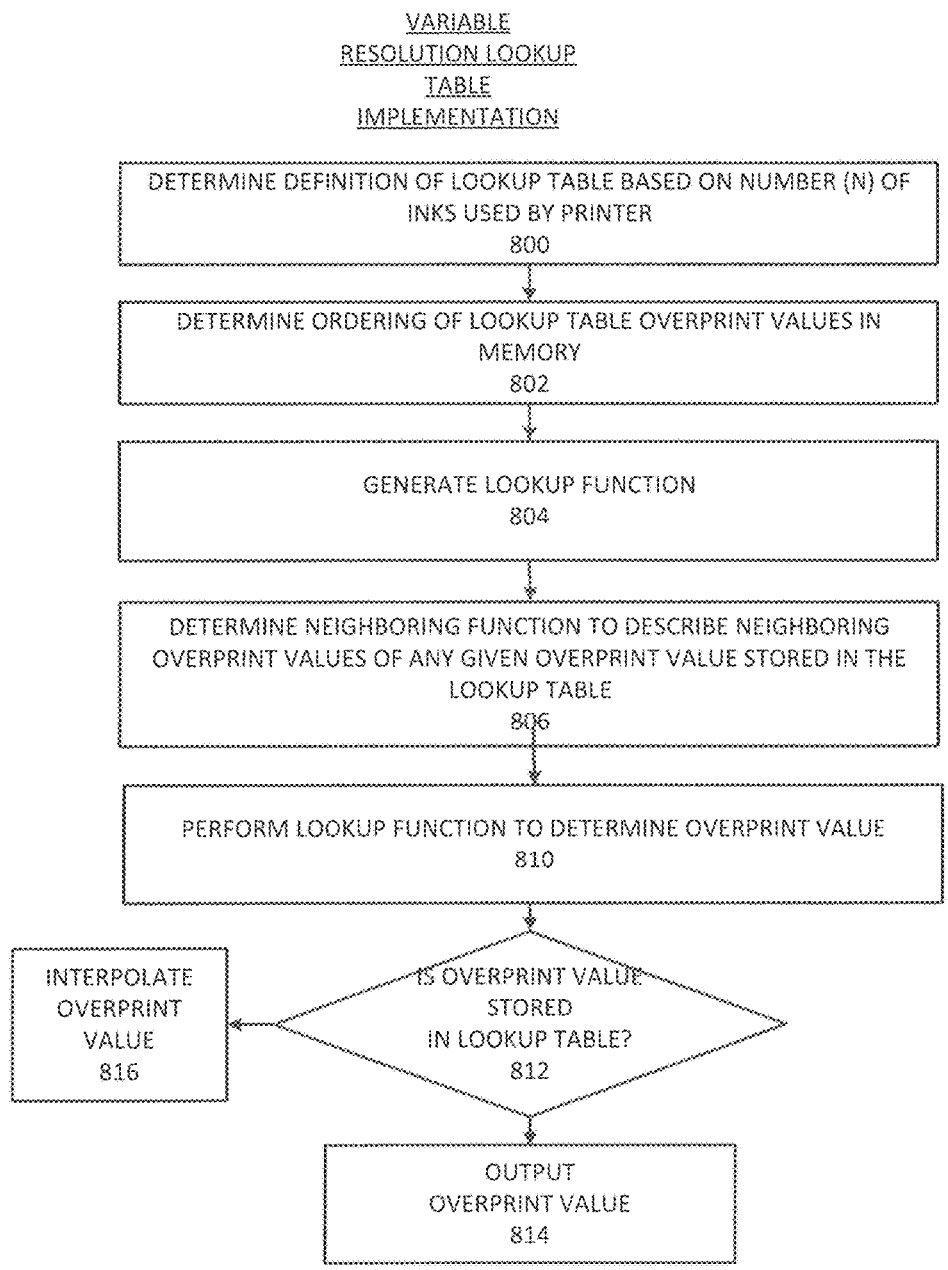
FIG. 8 shows a flowchart describing the variable resolution lookup table implementation.

FIG. 8 shows a flowchart for a variable resolution lookup table for performing color conversion. The flowchart is divided into five parts. A description of each of the parts of the process for generating and implementing the variable resolution lookup table is described below.

In a first part of variable resolution lookup table process, the variable resolution lookup table is generated based on the number of inks utilized and then stored in a specific order in memory. This is shown in FIG. 8 as step 800 (DETERMINE DEFINITION OF LOOKUP TABLE BASED ON NUMBER (N) OF INKS USED BY PRINTER). Below is a detailed description of this step.

The central idea of the variable resolution lookup table is to make X sparser in areas which include: 1) Areas where there is little information about the behavior of colors (mainly areas that have a significant amount of spot colors). 2) Areas where a lot of colors are present (e.g. customers use a lot of colors in one file, but almost never all on top of each other). This is also an area where even a more time consuming method F will not result in perfect matching. Higher density in this area is therefore both unnecessary and impractical.

Another central idea of the variable resolution lookup table is to boost the amount of points in X in color critical areas: 1) The CMYK part of $C_{Input}$, if present, often corresponds to images in the file that should be converted at high accuracy. 2) Areas where one spot color is dominant. Practically speaking, this is because this spot color represents the brand of the customer, and is critical to the quality of the final customer product. In one example, the density of points in X may correspond to a regular 30-grid.

The density in a certain areas therefore depend on which colors are present. For this reason a function is defined that for the pixels c in $C_{Input}$ indicates which colors are present: $Hash(c)=(h_1, h_2 \ldots)$ where $h_i=0$ if $c_i=0$ and $h_i=1$, else call $H_{input}$ the set of possible hash values in $C_{Input}$. $C_{Input}$ can be divided into areas of equal Hash value that are called regular subspaces. $H_{input}$ can then be used to indicate the set of regular subspaces.

The general idea is to give each regular subspace a different resolution, depending on how color critical that area is. For this a Reduction function is defined on the possible hashes: Reduction: $H_{input} \to \mathbb{N}$. This reduction formula is used in the following examples: Reduction(h)=0 if $h_i=0$ for all dimensions i that correspond to a spot color=P/2+S−1 where P is the number of process colors present in h and S is the number of spot colors present in h. The reduction pixels c in $H_{input}$ is extended by saying Reduction(c)=Reduction(Hash(c)). With a reduction formula X can be defined as:

$$\forall c \in C_{input} : c \in$$

$$X \iff \forall\, 0 < i \le d_{input} : \left( \exists\, k \in \mathbb{N} : 100 - c_i = k \cdot \frac{100}{n} \cdot 2^{Reduction(c)} \right)$$

OR $$c_i = 0$$

Where $n \in \mathbb{N}$, it can be seen as a maximum resolution. Reduction(c)=0 reduces to roughly the simple implementation (one exception being that the gaps are not equidistant). Two aspects of this definition are highlighted: $100 - c_i$ is used since that way the smallest gap is the one closest to 0. This is because for color conversion the area of low ink percentage is the most critical so the smaller gap will be most useful there. For a given regular subspace h in $H_{input}$ this corresponds to a regular grid of resolution $$\frac{n}{2^{Reduction(h)}}.$$

This grid becomes sparser exponentially with increasing values for the reduction. To finish this part the following pseudocode is used to find out whether a pixel is a member of X:

```
Function is InX(vector c, int n){
        Int stepsize = 100/n.2^Reduction(c)
        FOR(i in 1...dinput){
            IF(ci ≠ 0 AND floor(c_i/stepsize).stepsize≠c_i)
            {
            Return false
        } }
        Return true
}
```

For example, with a 3-dimensional input space consisting of 2 process colors and spot process color, a resolution of 100 and the reduction formula as defined above the following may result: The area of points (x,y,0) where x and y are natural numbers 1 . . . 100 is a regular grid. All points (0,0,x) with x a natural number from 1 to 100 are also contained. All points (2x,0,2y) and (0,2x,2y) are contained for x and y a natural number from 1 to 50. All points (4x,4y,4z) with x,y,z natural numbers from 1 to 25. The only point missing is (0,0,0). This example also shows the split into regular subspaces (i.e. there are 6 of them in this example). In a second part of the variable resolution lookup table process, the values of the variable resolution lookup table are stored in memory in a specific order. This is shown in FIG. 8 as step 802 (DETERMINE ORDERING OF LOOKUP TABLE OVERPRINT VALUES IN MEMORY). Below is a detailed description of this step.

The ordering O that defined for X is double lexicographically, taking advantage of the definition of $H_{input}$. Let $x^1$ and $x^2$ be elements of X and let $<_{lex}^{x}$ and $<_{lex}^{H}$ be the lexicographic orderings on X respectively H, then: $x^1 < x^2 \iff x^1 <_{lex}^{x} x^2$. If Reduction($x^1$)=Reduction($x^2$) $x^1 < x^2 \iff$ Hash($x^1$)$<_{lex}^{H}$ Hash($x^2$) else. In other words, the elements of X are grouped according to hash, with the elements of the group and the groups themselves ordered lexicographically.

In general, this ordering provides a quick way to calculate the number of elements for buffering. Remark that the size of H is easily seen to be $2^{d_{input}}$ and that every regular subspace $h \in H$ is a grid with resolution $$\max\left(\text{floor}\left(\frac{n}{2^{Reduction(h)}}\right), 1\right)$$

and as many dimensions as there are nonzero elements in the hash h. For reasons that will become clear later the process keeps track of where in the cache each hash starts. This gives the following function shown in pseudo-code:

```
FUNCTION getBufferSizeAndSubspaceStartPoints(int n, int d_input){
    Int bufferSize = 0
    vector currentHash = (0,0,...,0)
    Int hashIndex = 0
    vector subspaceStartPoints(2^d_input, 0)
    REPEAT{
        Int nrNonZeroPoints = 0
        FOR(I in 1... d_input){
            IF(currentHash[i]) nrNonZeroPoints++
        }
        subspaceStartPoints[hashIndex] = bufferSize
```

$$bufferSize \mathrel{+}= \max\left(\text{floor}\left(\frac{n}{2^{Reduction(currentHash)}}\right), 1\right)^{nrNonZeroPoints}$$

```
        IF(currentHash=(1,1,...,1)){
            RETURN bufferSize, subspaceStartPoints
        }
        currentHash++
        hashIndex++
    }
}
```

Using the definitions from the previous examples, hashes are ordered as following: (0,0,0)<(0,0,x)<(0,x,0)<(0,2x,2y)<(x,0,0)<(2x,0,2y)<(4x,4y,4z). The start indices for the 6 hashes are (0, 1, 101, 201, 451, 551, 801) and the entire buffer is 16426 points large. That is, hashes (0,0,x), (0,x,0), and (x,0,0) each have 100 values corresponding thereto, and hashes (0,2x,2y) and (2x,0,2y) each have 200 values corresponding thereto.

In a third part of variable resolution lookup table process, a lookup function is generated for retrieving values from the variable resolution lookup table. This is shown in FIG. 8 as steps 804 (GENERATE LOOKUP FUNCTION), 810 (PERFORM LOOKUP FUNCTION TO DETERMINE OVERPRINT VALUE), 812 (IS OVERPRINT VALUE STORED IN LOOKUP TABLE?) and 814 (OUTPUT OVERPRINT VALUE). Below is a detailed description of these steps.

Both for filling up the variable resolution lookup table and for using it in the interpolation, a fast lookup function is beneficial. The breakup into regular subspaces and the fact that the start points of the buffers for each regular subspace are cached may be taken advantage of such that the problem of looking up the value for x in X reduces to calculating the index of Hash(x) in H and calculating the index of x in Hash(x).

Calculating the index of a hash 11 in H is straightforward as shown in the following pseudo-code:

```
            FUNCTION calculateHashIndex(vector h){
                Int index = 0
                int increasingSize = 1
                FOR(i in d_input... 1){
                    IF(h[i]){
                        Index+= increasingSize
                    }
                    increasingSize = increasingSize.2
                }
                RETURN index
            }
            As is calculating the index of a point x in Hash(x):
            FUNCTION calculateIndexInHash(vector x){
                Int index
                int increasingSize = 1
```

$$int\ resolution = \max\left(\text{floor}\left(\frac{n}{2^{Reduction(h)}}\right), 1\right)$$

```
                FOR(i in d_input... 1){
                    IF(h[i]){
                        Index+= (h[i]-1).increasingSize
```

```
                        increasingSize = increasingSize.resolution
                }}
                RETURN index
            }
```

The general lookup is then a combination of these with the cached starting points:

```
FUNCTION lookup(vector x)
    RETURN subspaceStartPoins [calculateHashIndex(Hash(x))] +
calculateIndexInHash(x)
}
```

Point (4,0,14) is in hash (1,0,1) [(2x,0,2y)], which has starting point 551, as explained above. Inside this hash it has index 57 (x=2, y 7; 2*50+7 57) so its index in the buffer is 608. This lookup function can be used to quickly retrieve overprint values stored in the variable resolution lookup table.

In a fourth part of variable resolution lookup table process, neighboring function is generated for aiding in the interpolation variable resolution lookup table. This is shown in FIG. 8 as step 806 (DETERMINE NEIGHBORING FUNCTION TO DESCRIBE NEIGHBORING OVERPRINT VALUES OF ANY GIVEN OVERPRINT VALUE STORED IN THE LOOKUP TABLE). Below is a detailed description of this step.

While X is divided into regular grids H, the general space is not regular. This complicates finding neighboring points for a given pixel c in $C_{input}$. In general two hypercubes are used to describe the neighbors of c: The surrounding region (Region(c)) is the smallest hypercube in $C_{input}$ that contains c and for which all vertices are contained in X. The surrounding sector Sector(c) is a hypercube in $C_{input}$ that is contained inside of Region(c). Most interpolation formulas in a hypercube (like n-simplex interpolation) usually take only the vertices into account.

Region(c) allows n-simplex interpolation, but would not always take into account the cached points closest to c, lowering accuracy. Furthermore, adding even a small percent of a color may drastically lower the resolution, which might result in unacceptable color conversion. Accordingly, a smaller hypercube Sector(c) may be beneficial. Generally, any point in X close enough to c to affect its interpolation is a vertex in Sector(c) or Region(c).

The points in X that are contained in the Region of a pixel c are on the faces of the hypercube Region(c). This follows from the observation that any point x not on a face of Region(c) will be part of the same subspace Hash(c) as c. In this subspace X forms a regular grid, so x must be a vertex of Region(c). Otherwise there would be a smaller hypercube in this subspace that contains c.

Knowing this Region(x) is divided in parts depending on which points in X have to be taken into account. The idea is that along the edges of Region(x) the system takes into account any other elements of X that might be close. Further away from the edges the system cares less about the other elements of X.

For a given hypercube Region(c) and dimension i, call the face F(c,i) orthogonal to i in Region (c) the set {a |a $\in C_{input}$ ^ a$\in$Region(c)^a$_i$=O(c)$_i$}. For any dimension i there is an edge going through the origin Orig(c) of Region(c) along that dimension. The reduction along that dimension is denoted by Reduction(c,i). Call c close in dimension i if:

$$\text{floor}\left(\frac{100-c_i}{\text{Reduction}(c,i)}\right) = \text{floor}\left(\frac{100-0(c)_i-1}{\text{Reduction}(c,i)}\right)$$

This can be seen to mean that if only looking at dimension i, the space is divided in areas according to Reduction(c,i). c is then close in dimension i if it is in the same area as the origin of Region(c). What this means is that it is close enough to the face F(c,i) that will let elements of X in that F(c,i) have an effect in the final interpolations.

In general the system defines the Sector of c as follows. If c is not close to any dimension, then Sector(c)=Region(c). If there is a dimension i to which c is close, then c is projected onto F(c,i). Call the projection p, then Sector(c) is equal to Sector(p), except in dimension i where Sector(c) has edge length Reduction(c,i) instead of 0. If c is close to multiple dimensions it doesn't matter which one is used (since all calculations are only about one dimension at a time). In pseudocode it is represented as:

```
FUNCTION Reduction(vector c, int i){
    Vector RegionOrigin, RegionLengths = Region(c)
    Vector SectorOrigin = RegionOrigin
    Vector SectorLengths = RegionLengths
    Vector edgeHash = Hash(RegionOrigin)
    edgeHash[i] = 1
```

$$\text{RETURN } \frac{100}{n} \cdot 2^{Reduction(edgeHash)}$$

```
}
FUNCTION CloseInDimension(vector c, vector origin,int i){
    int reduction = Reduction(c,i)
    int pixelArea = (100-c[i])/(reduction)
    int originArea = (99-origin[i]/reduction)
    return pixelArea==originArea
}
FUNCTION Sector(vector c){
    Vector RegionOrigin, RegionLengths = Region(c)
    Vector SectorOrigin
    Vector SectorLengths
    boolean closeDimensionFound=false
    FOR(i in 1..d_index){
      If(CloseInDimension(c, RegionOrigin, i))
      {
         Vector p = c
         p[i] = RegionOrigin[i]
         closeDimensionFound = true
         SectorOrigin, SectorLengths = Sector(p)
         SectorLengths[i] = Reduction(c,i)
      }
    }
    If(!closeDimensionFound)
    {
      SectorOrigin = RegionOrigin
      SectorLengths = RegionLengths
    }
    RETURN SectorOrigin, SectorLengths
}
```

In a fifth part of variable resolution lookup table process, the neighboring function is used to perform interpolation variable resolution lookup table. This is shown in FIG. 8 as step 816. Below is a detailed description of this step.

By definition, Sector(c) is contained in Region(c) and the missing sector points of c are calculated by interpolation in Region(c). This process is described in the following pseudo-code:

```
FUNCTION interpolate(vector c, Cache F){
    Cache sectorValuesCache
    FOR(s in Sector(c)){
        IF( isInX(s) ){
            sectorValuesCache.add(F(lookup(s)))
        }ELSE{
            sectorValuesCache.add(interpolateSimplex(s, Region(c),F))
        }
    }
    RETURN interpolateSimplex(c, Sector(s), sectorValuesCache)
}
```

In general, this process combines the consistency of interpolating in adjacent hypercubes with the accuracy of using the closest cached points. Importantly, the Reduction function on H can be adjusted at will, allowing the adaption of the lookup table to different situations.

One major advantage of the variable resolution lookup table implementation is that it is more efficient (less data points are needed), and therefore more practical than the uniform resolution lookup table implementation. For example, as remarked before, a regular 10-grid will have $11^{d_{input}}$ points. In general all the edges of the color space are used to make a conversion, giving a lower bound of $2^{d_{input}}$ for any approach.

The following is further detail about why the space was divided into sectors in a particular manner. For example, take two points c and d in $C_{input}$ that are almost equal except for a small difference in one dimension i. For convenience assume that $c_i < c_i$. The following are evaluations of all the possible cases:

When c and d are in different Hashes: This happens if $c_i=0$. In this case they will have different regions, but when calculating Sector(d) it is found that d is close to dimension i. Because the projection of d along dimension i is exactly c it follows that Sector(d) is Sector(c) extended along dimension i by Reduction(d,i). Since d is so close to Sector (c) the interpolation assigns a high weight to the vertices of Sector(c) relative to the other vertices of Sector(d). This means that a transition from c to d behaves smoothly.

When c and d have the same hash but different regions: Since Region(c) and Region(d) are adjacent in a regular grid they share a face F. The points c and d are on either side of this face but very close to it. This means that the points in F have a very high weight in the interpolation and a transition from c to d is smooth.

When c and d have the same sector: This results in a smooth transition from c to d since the same points are used in the interpolation and the interpolation formula is assumed smooth.

Figure 9:
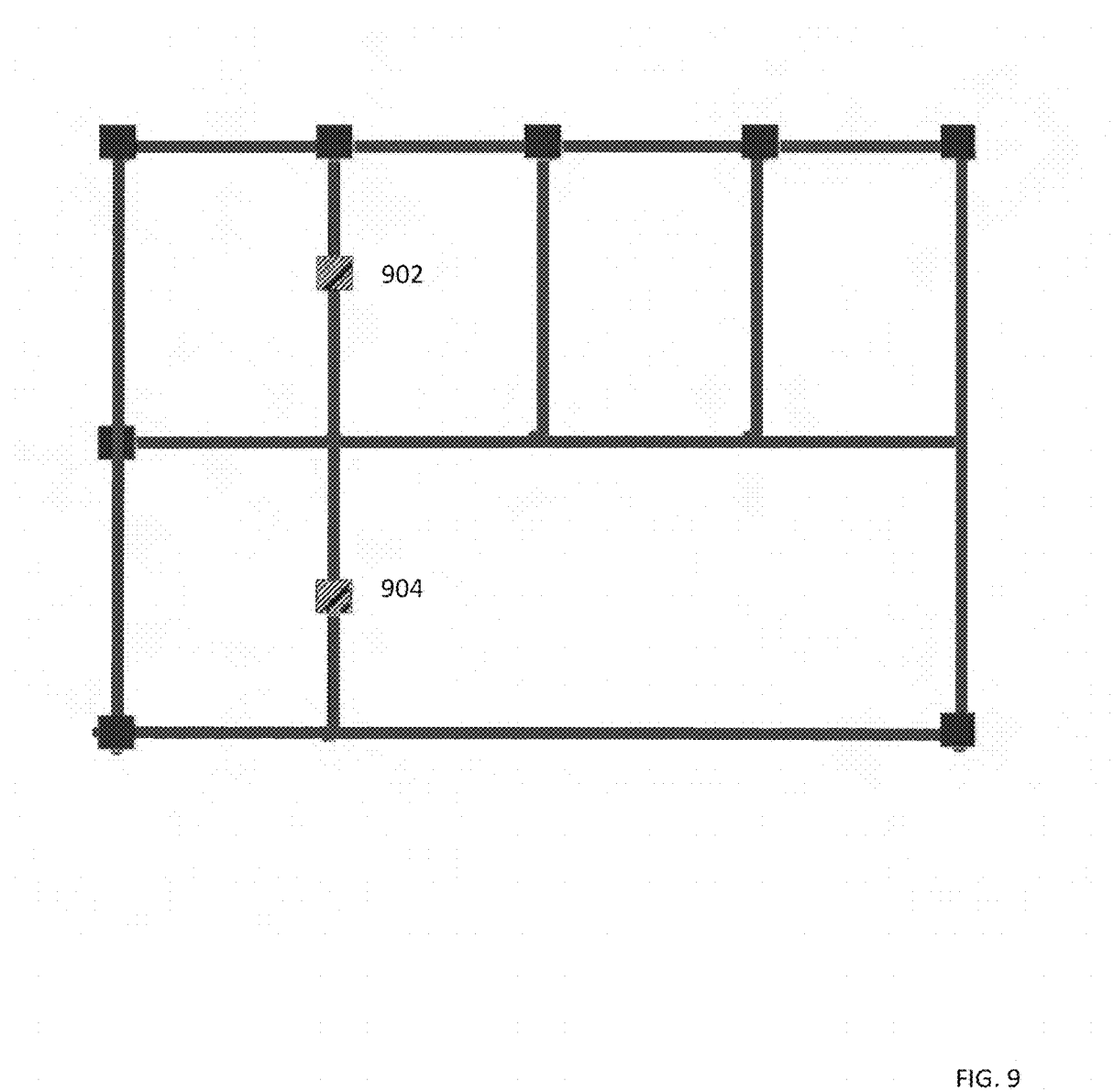
FIG. 9 shows interpolation between the variable distribution of overprint values in the variable resolution lookup table.

When c and d have the same region but different sectors (i.e. c is close to i while d is not): It follows that c and d are in different parts of the partition (see FIG. 9) of their shared region along Reduction(c,i)=Reduction(d,i). Specifically c is in the partition containing Orig(c)=Orig(d) while d is in the one adjacent to that one. If they are close they must be close to the transition between the two partitions. This means that c is close to the face F of Sector(c) that is in this transition.

If there is a point x in X that is also in F (see 902 in FIG. 9), it means that c is close to another dimension j. It follows that d is also close to that dimension j and that x is also part of Sector(d). Because the order is chosen for projecting along dimensions a point is close to, the system can project along any dimension j like this first and it follows that F is also a face of Sector(d). In this case the points of F have a very high weight in both the interpolation of c and d and the transition from c to d is smooth.

If there is no point from X in F (see 904 in FIG. 9), this means that all vertices in F are missing and interpolated from Region(c)=Region(d). This means that the points in Region (c) have very high weight in the interpolation of both c and d and the transition between them is smooth.

Figure 10:
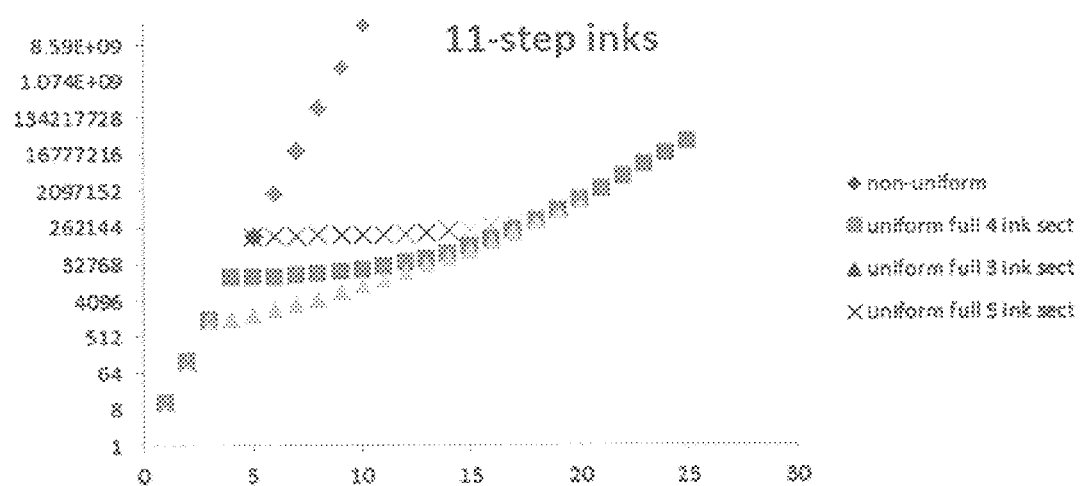
FIG. 10 shows a data plot comparing table sizes for set numbers of inks in both the uniform resolution lookup table and the variable resolution lookup table.

FIG. 10 shows a data plot of the comparison of size in stored data points between both variable and uniform look-up table entries. It can be clearly seen from FIG. 10 that as the number of inks increases (see the X axis), the number of look-up table entries increases very rapidly. This increase in the size of look-up tables is amplified, especially for the uniform resolution look-up table. By utilizing the variable resolution look-up tables, the values somewhat level off at a realistic size that can be stored in memory of the PC and/or printing device.

Figure 11:
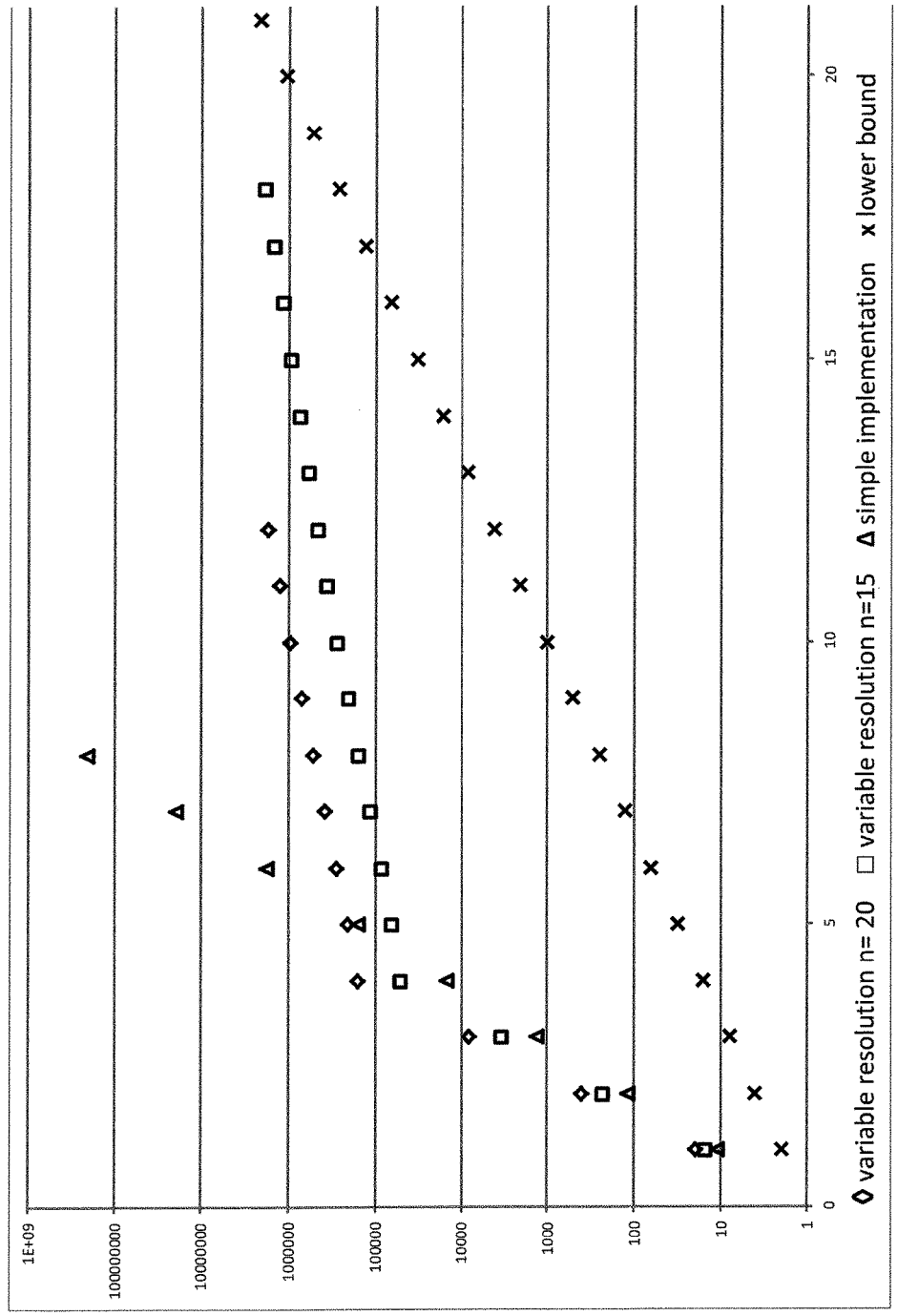
FIG. 11 shows another data plot comparing table sizes for set numbers of inks in both the uniform resolution lookup table and the variable resolution lookup table.

FIG. 11 also shows graph comparing the regular 10-grid with the lower bound and a variable resolution table with maximal resolution 15 or 20, reduction formula as in the examples with the first 4 inks being process colors and the other inks being spot colors. To be realistic in industrial uses, 1,000,000 cached points is a good cutoff. The simple uniform resolution implementation in FIG. 11 reaches this cutoff at only 6 input inks, where the lower bound ensures that this can be reached for 20 inks. The variable resolution lookup tables reaches this cutoff, depending on the maximal resolution, for 10 or 15 input inks, which is more than high enough to capture almost all use cases in industrial applications. Thus, the variable resolution lookup tables have a much higher density in the process colors, orders of magnitude above what the simple uniform implementation reaches, while still converging to the lower bound once spot colors get added.

In general, the variable resolution lookup table described herein solves the scalability problem of the simple uniform implementation in a flexible way. By adjusting the Reduction formula it can be tailored to specific needs and even higher accuracy in color critical areas can be achieved than is possible with the simple implementation. Asymptotically it is possible to converge to the lower bound of what is possible and this approach remains practically feasible even for a file containing 15 inks.

Calculating the sector is recursive but many of the calculation can be cached between different recursions. What is still needed is calculating the region in every iteration and $O(d_{input})$ to look for a new dimension that a point is close to. Worst case scenario these operations need to happen $d_{input}$ times, if the system has to iterate for every dimension. This gives looking for the sector $O(d^{2_{input}})$ complexity. In reality the number of iterations is almost always much less than $d_{input}$.

There are no problems with the presented algorithms in terms of scaling with increasing dimensions. In real life examples the $O(d_{input}^3)$ worst case scenario doesn't happen often enough to make both implementations scale differently. Thus, the actual implementation can be made sufficiently fast for industrial use. In real life jobs there is a fixed overhead that is added when using the variable resolution table compared to the simple implementation.

There are several aspects in which the design of this table was done with color conversion in mind. It often happens that existing files are tweaked by adding in some new design element or some new colors. These changes can trigger an extension of the color space associated with the file. When converting the file, this should not affect the conversion of the elements in the file that were not changed.

For accelerated color conversion this means that by adding another ink to the input color space, none of the resolutions should be changed in the areas that only contain the original inks. Ensuring this is a further restriction on the choice for Reduction(x).

A further benefit of this is the fact that the entire cache does not have to be recalculated if an ink is added. Only the parts of the cache containing this new ink will need to be updated, though the regular subspaces need to be rearranged. Inks are typically chosen so they behave quite linearly. Amongst other things, this makes interpolation formula is more accurate.

It is however often the case for mechanical reasons that inks behave quite non-linearly when the ink percentages are very low. The reason being mechanical constraints on the printing device. It is therefore recommended to have a high density of cached points in these areas.

The simple uniform implementation is not able to have this density once more than 4 inks come into play. With the variable resolution table, for low ink percentages, the effective resolution will be close to the maximal resolution, which is generally higher than in the simple uniform implementation. This is the main drawback to other methods for handling high-dimensional input color spaces. Because the entire color space is contained in one data structure and our interpolation method ensures that the closest cached points are all taken into account, the variable resolution table is able to guarantee smooth behavior in these situations.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in fewer than all features of a single disclosed embodiment. Thus the following claims are hereby incorporated into the Detailed Description, with each claim standing on its own as a separately claimed subject matter.

What is claimed is:

1. A printing system comprising:
   a printing mechanism for applying ink to a substrate, the printing mechanism operable to print using a plurality of print colors such that each unit of a printed output has a color expressed as a set of coordinates in a printing color space, including some coordinates corresponding to ink overprint values;
   a computer readable media storing digital information including:
      instructions for reading an input image file comprising information defining an image in which each unit of the image has a color defined by a combination of image colors expressed as a set of coordinates in an image color space;
      instructions for generating entries in a variable resolution lookup table for use in performing color conversion of the image from the image color space to the printing color space using a color conversion function; and
   a lookup table generator configured to:
      divide the lookup table into a plurality of areas, each area corresponding to a printing color subspace,
      set a density of lookup table entries in each of the plurality of areas based on overprint values of the print colors, wherein the density of entries is varied from one area to another;
      store the lookup table entries according to the varied density, such that the lookup table includes a varied grid of color values corresponding to the printing color space, and
      generate a lookup function for accessing the lookup table entries when performing color conversion from the image space to the substrate; and
   a color conversion controller configured to utilize the lookup function to retrieve one or more lookup table entries from different areas of the same lookup table and to provide printing color space coordinates based upon the one or more lookup table entries to the printing mechanism for applying the ink to a substrate,
   wherein the lookup table generator is configured to vary the densities in the plurality of areas based upon the number of colors in the printing color space, such that the densities are relatively greater for a relatively lesser number of colors in the printing color space than for a relatively greater number of colors in the printing color space.

2. The system of claim 1, wherein the lookup table generator is configured to divide the lookup table into a regular plurality of areas, each area having a variable resolution.

3. The system of claim 1, wherein the lookup table generator is further configured to set the varied density in the plurality of areas such that areas having relatively more critical overprint values are filled with a relatively higher density of entries, and areas having relatively less critical overprint values are filled with a relatively lower density of entries.

4. The system of claim 1, wherein the lookup table generator is further configured to generate the lookup function by indexing the lookup table entries according to corresponding image space overprint values.

5. The system of claim 1, wherein the color conversion controller is further configured to interpolate values for coordinates in the printing color space that are not populated in the lookup table by using neighboring entries that are populated in the lookup table, and the lookup table generator is further configured to define hypercubes in the lookup table that determine lookup table values to be used during interpolation.

6. The system of claim 5, wherein the lookup table controller is further configured to interpolate in adjacent hypercubes using lookup table entries closest to the coordinates.

7. The system of claim 1, wherein the lookup table generator is configured to control the densities in the plurality of areas such that the total number of entries in the lookup table remains below a predetermined cutoff and above a predetermined lower bound.

8. The system of claim 7, wherein predetermined cutoff has an order of magnitude of approximately a million entries, and the lower bound corresponds to $2^n$ wherein n=the number of inks.

9. The system of claim 1, wherein the lookup table generator is configured to generate the lookup table for a first plurality of inks and to regenerate the table for a second plurality of inks containing at least one ink not in the first plurality by repopulating only those portions of the lookup table changed by presence of the at least one ink not in the first plurality.

10. A printing system comprising:
   a printing mechanism for applying ink to a substrate, the printing mechanism operable to print using a plurality of print colors such that each unit of a printed output has a color expressed as a set of coordinates in a printing color space, including some coordinates corresponding to ink overprint values;
   a computer readable media storing digital information including:
      instructions for reading an input image file comprising information defining an image in which each unit of the image has a color defined by a combination of image colors expressed as a set of coordinates in an image color space;
      instructions for generating entries in a variable resolution lookup table for use in performing color conversion of the image from the image color space to the printing color space using a color conversion function; and
   a lookup table generator configured to:
      divide the lookup table into a plurality of areas, each area corresponding to a printing color subspace,
      set a density of lookup table entries in each of the plurality of areas based on overprint values of the print colors, wherein the density of entries is varied from one area to another;
      store the lookup table entries according to the varied density, such that the lookup table includes a varied grid of color values corresponding to the printing color space, and generate a lookup function for accessing the lookup table entries when performing color conversion from the image space to the substrate; and a color conversion controller configured to utilize the lookup function to retrieve one or more lookup table entries from different areas of the same lookup table and to provide printing color space coordinates based upon the one or more lookup table entries to the printing mechanism for applying the ink to a substrate, wherein the lookup table generator is further configured to store the lookup table entries in the computer readable media in an order determined by double lexicography by ordering the areas of entries lexicographically and the entries within each of the areas lexicographically.

11. A printing system comprising:

a printing mechanism for applying ink to a substrate, the printing mechanism operable to print using a plurality of print colors such that each unit of a printed output has a color expressed as a set of coordinates in a printing color space, including some coordinates corresponding to ink overprint values;

a computer readable media storing digital information including:

instructions for reading an input image file comprising information defining an image in which each unit of the image has a color defined by a combination of image colors expressed as a set of coordinates in an image color space;

instructions for generating entries in a variable resolution lookup table for use in performing color conversion of the image from the image color space to the printing color space using a color conversion function; and a lookup table generator configured to:

divide the lookup table into a plurality of areas, each area corresponding to a printing color subspace, set a density of lookup table entries in each of the plurality of areas based on overprint values of the print colors, wherein the density of entries is varied from one area to another;

store the lookup table entries according to the varied density, such that the lookup table includes a varied grid of color values corresponding to the printing color space, and generate a lookup function for accessing the lookup table entries when performing color conversion from the image space to the substrate; and a color conversion controller configured to utilize the lookup function to retrieve one or more lookup table entries from different areas of the same lookup table and to provide printing color space coordinates based upon the one or more lookup table entries to the printing mechanism for applying the ink to a substrate, wherein the color conversion controller is further configured to interpolate values for coordinates in the printing color space that are not populated in the lookup table by using neighboring entries that are populated in the lookup table, and the lookup table generator is further configured to define hypercubes in the lookup table that determine lookup table values to be used during interpolation, and wherein the lookup table generator is further configured to define a first hypercube which is a smallest hypercube that contains a pixel, and a second hypercube which is a largest hypercube that contains a pixel in the lookup table, wherein the first and second hypercube used to determine lookup table values used during interpolation.

12. A printing system comprising:

a printing mechanism for applying ink to a substrate, the printing mechanism operable to print using a plurality of print colors such that each unit of a printed output has a color expressed as a set of coordinates in a printing color space, including some coordinates corresponding to ink overprint values;

a computer readable media storing digital information including:

instructions for reading an input image file comprising information defining an image in which each unit of the image has a color defined by a combination of image colors expressed as a set of coordinates in an image color space;

instructions for generating entries in a variable resolution lookup table for use in performing color conversion of the image from the image color space to the printing color space using a color conversion function; and a lookup table generator configured to:

divide the lookup table into a plurality of areas, each area corresponding to a printing color subspace, set a density of lookup table entries in each of the plurality of areas based on overprint values of the print colors, wherein the density of entries is varied from one area to another;

store the lookup table entries according to the varied density, such that the lookup table includes a varied grid of color values corresponding to the printing color space, and generate a lookup function for accessing the lookup table entries when performing color conversion from the image space to the substrate; and a color conversion controller configured to utilize the lookup function to retrieve one or more lookup table entries from different areas of the same lookup table and to provide printing color space coordinates based upon the one or more lookup table entries to the printing mechanism for applying the ink to a substrate, wherein the lookup table generator is further configured to set the varied density in the plurality of areas such that areas having relatively more critical overprint values are filled with a relatively higher density of entries, and areas having relatively less critical overprint values are filled with a relatively lower density of entries, and wherein lookup table areas corresponding to printing color subspaces having relatively lower ink percentages are populated with relatively higher densities than lookup table areas corresponding to printing color subspaces having relatively higher ink percentages.

13. A printing system comprising:

a printing mechanism for applying ink to a substrate, the printing mechanism operable to print using a plurality of print colors such that each unit of a printed output has a color expressed as a set of coordinates in a printing color space, including some coordinates corresponding to ink overprint values;

a computer readable media storing digital information including:

instructions for reading an input image file comprising information defining an image in which each unit of the image has a color defined by a combination of image colors expressed as a set of coordinates in an image color space;

instructions for generating entries in a variable resolution lookup table for use in performing color conversion of the image from the image color space to the printing color space using a color conversion function; and a lookup table generator configured to:
divide the lookup table into a plurality of areas, each area corresponding to a printing color subspace,
set a density of lookup table entries in each of the plurality of areas based on overprint values of the print colors, wherein the density of entries is varied from one area to another;
store the lookup table entries according to the varied density, such that the lookup table includes a varied grid of color values corresponding to the printing color space, and
generate a lookup function for accessing the lookup table entries when performing color conversion from the image space to the substrate; and a color conversion controller configured to utilize the lookup function to retrieve one or more lookup table entries from different areas of the same lookup table and to provide printing color space coordinates based upon the one or more lookup table entries to the printing mechanism for applying the ink to a substrate, wherein the lookup table generator is further configured to set the varied density in the plurality of areas such that areas having relatively more critical overprint values are filled with a relatively higher density of entries, and areas having relatively less critical overprint values are filled with a relatively lower density of entries, and wherein lookup table areas corresponding to printing color subspaces containing ink combinations having a relatively higher probability of use are populated with relatively higher densities than lookup table areas corresponding to printing color subspaces containing ink combinations having a relatively lower probability of use.

14. A printing system comprising:
a printing mechanism for applying ink to a substrate, the printing mechanism operable to print using a plurality of print colors such that each unit of a printed output has a color expressed as a set of coordinates in a printing color space, including some coordinates corresponding to ink overprint values;
a computer readable media storing digital information including:
instructions for reading an input image file comprising information defining an image in which each unit of the image has a color defined by a combination of image colors expressed as a set of coordinates in an image color space;
instructions for generating entries in a variable resolution lookup table for use in performing color conversion of the image from the image color space to the printing color space using a color conversion function; and
a lookup table generator configured to:
divide the lookup table into a plurality of areas, each area corresponding to a printing color subspace,
set a density of lookup table entries in each of the plurality of areas based on overprint values of the print colors, wherein the density of entries is varied from one area to another;
store the lookup table entries according to the varied density, such that the lookup table includes a varied grid of color values corresponding to the printing color space, and
generate a lookup function for accessing the lookup table entries when performing color conversion from the image space to the substrate; and
a color conversion controller configured to utilize the lookup function to retrieve one or more lookup table entries from different areas of the same lookup table and to provide printing color space coordinates based upon the one or more lookup table entries to the printing mechanism for applying the ink to a substrate,
wherein the lookup table generator is configured to divide the lookup table into a regular plurality of areas, each area having a variable resolution, and
wherein the relative density of each of the plurality of areas is determined using a reduction function in which the reduction function for at least one of the plurality of areas has a different resolution than at least one other of the plurality of areas.

15. A printing system comprising:
a printing mechanism for applying ink to a substrate, the printing mechanism operable to print using a plurality of print colors such that each unit of a printed output has a color expressed as a set of coordinates in a printing color space;
a computer readable media storing digital information including:
instructions for reading an input image file comprising information defining an image in which each unit of the image has a color defined by a combination of image colors expressed as a set of coordinates in an image color space;
a lookup table including a plurality of areas having a varied density of lookup table entries for use in performing color conversion of the image from the image color space to the printing color space using a color conversion function, wherein the density in each of the plurality of areas is based upon a number of colors in the printing color space and likelihood of the printing mechanism using overprint values corresponding to the printing space coordinates represented by the lookup table entries, such that the density is relatively greater for a relatively lesser number of colors in the printing color space than for a relatively greater number of colors in the printing color space, and
instructions for implementing a lookup function for the printing mechanism to access the lookup table entries when performing color conversion of the image; and
a color conversion controller configured to:
access the stored digital information corresponding to the image,
determine image color space coordinates of selected pixels in the image,
retrieve entries from different areas of the same lookup table when the lookup table includes entries that correspond to the printing space coordinates corresponding to the image color space coordinates of the selected pixels,
interpolate entries from the lookup table when the lookup table does not include entries that correspond to the image color space coordinates, and control the printing mechanism to apply the ink to the substrate based on the retrieved and interpolated entries.

16. A printing system comprising:
a printing mechanism for applying ink to a substrate, the printing mechanism operable to print using a plurality of print colors such that each unit of a printed output has a color expressed as a set of coordinates in a printing color space, including some coordinates corresponding to ink overprint values;
a computer readable media storing digital information including:
  instructions for reading an input image file comprising information defining an image in which each unit of the image has a color defined by a combination of image colors expressed as a set of coordinates in an image color space;
  instructions for generating entries in a variable resolution lookup table for use in performing color conversion of the image from the image color space to the printing color space using a color conversion function; and
a lookup table generator configured to:
  divide the lookup table into a plurality of areas, each area corresponding to a printing color subspace,
  set a density of lookup table entries in each of the plurality of areas based on overprint values of the print colors, wherein the density of entries is varied from one area to another;
  store the lookup table entries according to the varied density, such that the lookup table includes a varied grid of color values corresponding to the printing color space, and
  generate a lookup function for accessing the lookup table entries when performing color conversion from the image space to the substrate; and
a color conversion controller configured to utilize the lookup function to retrieve one or more lookup table entries from different areas of the same lookup table and to provide printing color space coordinates based upon the one or more lookup table entries to the printing mechanism for applying the ink to a substrate,
wherein the lookup table generator is configured to divide the lookup table into a regular plurality of areas, each area having a variable resolution,
wherein the relative density of each of the plurality of areas is determined using a reduction function in which the reduction function for at least one of the plurality of areas has a different resolution than at least one other of the plurality of areas, and
wherein the color conversion controller is further configured to retrieve the entries from the lookup table by using indexing of the lookup table entries according to corresponding image space overprint values.

17. A printing system comprising:
a printing mechanism for applying ink to a substrate, the printing mechanism operable to print using a plurality of print colors such that each unit of a printed output has a color expressed as a set of coordinates in a printing color space, including some coordinates corresponding to ink overprint values;
a computer readable media storing digital information including:
  instructions for reading an input image file comprising information defining an image in which each unit of the image has a color defined by a combination of image colors expressed as a set of coordinates in an image color space;
  instructions for generating entries in a variable resolution lookup table for use in performing color conversion of the image from the image color space to the printing color space using a color conversion function; and
a lookup table generator configured to:
  divide the lookup table into a plurality of areas, each area corresponding to a printing color subspace,
  set a density of lookup table entries in each of the plurality of areas based on overprint values of the print colors, wherein the density of entries is varied from one area to another;
  store the lookup table entries according to the varied density, such that the lookup table includes a varied grid of color values corresponding to the printing color space, and
  generate a lookup function for accessing the lookup table entries when performing color conversion from the image space to the substrate; and
a color conversion controller configured to utilize the lookup function to retrieve one or more lookup table entries from different areas of the same lookup table and to provide printing color space coordinates based upon the one or more lookup table entries to the printing mechanism for applying the ink to a substrate,
wherein the lookup table generator is configured to divide the lookup table into a regular plurality of areas, each area having a variable resolution,
wherein the relative density of each of the plurality of areas is determined using a reduction function in which the reduction function for at least one of the plurality of areas has a different resolution than at least one other of the plurality of areas, and
wherein the color conversion controller is further configured to interpolate the lookup table entries using hypercubes that determine adjacent lookup table values to be used during interpolation.

18. A printing system comprising:
a printing mechanism for applying ink to a substrate, the printing mechanism operable to print using a plurality of print colors such that each unit of a printed output has a color expressed as a set of coordinates in a printing color space, including some coordinates corresponding to ink overprint values;
a computer readable media storing digital information including:
  instructions for reading an input image file comprising information defining an image in which each unit of the image has a color defined by a combination of image colors expressed as a set of coordinates in an image color space;
  instructions for generating entries in a variable resolution lookup table for use in performing color conversion of the image from the image color space to the printing color space using a color conversion function; and
a lookup table generator configured to:
  divide the lookup table into a plurality of areas, each area corresponding to a printing color subspace,
  set a density of lookup table entries in each of the plurality of areas based on overprint values of the print colors, wherein the density of entries is varied from one area to another;

store the lookup table entries according to the varied density, such that the lookup table includes a varied grid of color values corresponding to the printing color space, and generate a lookup function for accessing the lookup table entries when performing color conversion from the image space to the substrate; and a color conversion controller configured to utilize the lookup function to retrieve one or more lookup table entries from different areas of the same lookup table and to provide printing color space coordinates based upon the one or more lookup table entries to the printing mechanism for applying the ink to a substrate, wherein the lookup table generator is configured to divide the lookup table into a regular plurality of areas, each area having a variable resolution, wherein the relative density of each of the plurality of areas is determined using a reduction function in which the reduction function for at least one of the plurality of areas has a different resolution than at least one other of the plurality of areas, and wherein the color conversion controller is further configured to define a first hypercube which is a smallest hypercube that contains the pixel, and a second hypercube which is a largest hypercube that contains the pixel in the lookup table, the first and second hypercube used to determine lookup table values to be used during interpolation.

19. The system of claim 18, wherein the color conversion controller is further configured to interpolate in adjacent hypercubes using lookup table entries closest to the coordinates.

20. An image output method comprising:

accessing, by a color conversion controller, digital information stored on a computer readable media to implement a lookup function, the stored digital information including:

a variable density lookup table comprising a plurality of lookup table entries for converting coordinates in an input color space to coordinates in an output color space using a color conversion function, the lookup table including a plurality of areas, the plurality of areas having a plurality of densities of lookup table entries, wherein the density in each of the plurality of areas is based upon a number of colors in the output color space and a likelihood of color combinations represented by the areas being utilized by an output device, such that the densities are relatively greater for a relatively lesser number of colors in the output color space than for a relatively greater number of colors in the output color space, and instructions for implementing the lookup function to access the lookup table entries from different areas of the same lookup table when performing color conversion from the input color space to the output color space for providing coordinates in the output color space to the output device;

determining, by the color conversion controller, input color space coordinates corresponding to selected pixels in an input image;

retrieving, by the color conversion controller, entries from the lookup table when the lookup table is populated with entries that correspond to the output color space coordinates of the selected pixels, the retrieved entries the output color space coordinates that correspond to input color space coordinates converted using the color conversion function;

interpolating, by the color conversion controller, output color space coordinates using neighboring entries from the lookup table when the lookup table is not populated with entries that correspond to the output color space coordinates of the selected colors; and controlling, by the color conversion controller, the output device to apply the retrieved and interpolated entries to create a representation of the input image in the output color space using the output device.

21. The method of claim 20, further comprising:

interpolating, by the color conversion controller, the lookup table entries using hypercubes that determine adjacent lookup table values to be used during interpolation.

22. The method of claim 21, further comprising:

defining, by the color conversion controller, a first hypercube which is a smallest hypercube that contains the pixel, and a second hypercube which is a largest hypercube that contains the pixel in the lookup table; and using the first and second hypercube to determine lookup table values to be used during interpolation.

23. The system of claim 21, interpolating, by the color conversion controller, in adjacent hypercubes using lookup table entries closest to the coordinates.

* * * * *

UNITED STATES PATENT AND TRADEMARK OFFICE
CERTIFICATE OF CORRECTION

PATENT NO. : 10,015,366 B2
APPLICATION NO. : 15/260728
DATED : July 3, 2018
INVENTOR(S) : Kristof Vanderhoydonck It is certified that error appears in the above-identified patent and that said Letters Patent is hereby corrected as shown below:

In the Claims

At Column 18, Lines 16-17 "lookup table controller" should read --color conversion controller--

Signed and Sealed this
Seventh Day of July, 2020

Andrei Iancu
*Director of the United States Patent and Trademark Office*